US010143300B2

(12) United States Patent
Johnson

(10) Patent No.: US 10,143,300 B2
(45) Date of Patent: Dec. 4, 2018

(54) MATERIAL HOLDER

(71) Applicant: Innovative Tools & Technologies, Inc., Saint Paul, MN (US)

(72) Inventor: Bryan T. Johnson, Vadnais Heights, MN (US)

( * ) Notice: Subject to any disclaimer, the term of this patent is extended or adjusted under 35 U.S.C. 154(b) by 142 days.

(21) Appl. No.: 13/646,009

(22) Filed: Oct. 5, 2012

(65) Prior Publication Data

US 2013/0026120 A1 Jan. 31, 2013

Related U.S. Application Data

(63) Continuation-in-part of application No. 13/209,022, filed on Aug. 12, 2011.

(60) Provisional application No. 61/391,427, filed on Oct. 8, 2010.

(51) Int. Cl.
| | | |
|---|---|---|
| B65H 35/00 | (2006.01) | |
| B65H 16/00 | (2006.01) | |
| A47B 55/02 | (2006.01) | |
| B65B 11/02 | (2006.01) | |
| B65H 67/08 | (2006.01) | |
| A47L 13/51 | (2006.01) | |
| B25H 1/12 | (2006.01) | |
| B25H 3/06 | (2006.01) | |
| B62B 3/00 | (2006.01) | |
| B62B 3/10 | (2006.01) | |
| B62B 5/00 | (2006.01) | |

(52) U.S. Cl.
CPC .............. *A47B 55/02* (2013.01); *A47L 13/51* (2013.01); *B25H 1/12* (2013.01); *B25H 3/06* (2013.01); *B62B 3/005* (2013.01); *B62B 3/10* (2013.01); *B65B 11/025* (2013.01); *B65H 35/0006* (2013.01); *B65H 67/085* (2013.01); *B62B 5/0096* (2013.01); *B62B 2203/00* (2013.01)

(58) Field of Classification Search
CPC ..... A47F 5/35; B65H 35/004; B65H 35/0006; B62B 3/002; A47B 55/02; B65B 11/025; B65B 67/085; B65B 67/08
USPC .... 211/106, 106.01, 181.1, 70.6, 189, 85.31, 211/133.2, 133.1, 133.5, DIG. 1
See application file for complete search history.

(56) References Cited

U.S. PATENT DOCUMENTS

| | | | | | |
|---|---|---|---|---|---|
| 1,116,834 | A | * | 11/1914 | Nelson | ............................ 225/67 |
| 1,518,749 | A | * | 12/1924 | Nelson | ............................ 225/67 |
| 1,930,076 | A | * | 10/1933 | Bentley | ........................ 280/79.3 |
| 1,932,143 | A | * | 10/1933 | Piercy | ........................... 362/398 |

(Continued)

OTHER PUBLICATIONS

"Wireline.net—Four Way Merchandiser with Gridwall Panels" [online]. http://www.wireline.net, (captured Sep. 6, 2006 on the Internet Archive—http://archive.org) [retrieved on Jun. 1, 2012]. Retrieved from the Internet:<URL: http://www.wireline.net/browseproducts/Four-Way-Merchandiser.HTML>; 1 pgs.

(Continued)

*Primary Examiner* — Kimberley S Wright
(74) *Attorney, Agent, or Firm* — Meuting, Raasch & Gebhardt, P.A.

(57) ABSTRACT

Material holders for use with a structure (e.g., a stand, tool box, etc.) may include material holding apparatus configured to hold a roll and/or box of material. The material holding apparatus may be configured to hold various material in an organized, open, and unobstructed manner to provide convenient access to the material.

19 Claims, 32 Drawing Sheets

(56) References Cited

U.S. PATENT DOCUMENTS

| | | | |
|---|---|---|---|
| 2,325,712 A | | 8/1943 | Shurmur |
| 2,433,406 A | | 12/1947 | Standlee |
| 2,598,992 A | * | 6/1952 | Gordon ............... 242/557 |
| 2,998,886 A | | 9/1961 | Sides |
| 3,007,708 A | | 11/1961 | Ochs |
| 3,088,686 A | * | 5/1963 | Curry ............... 242/596.1 |
| 3,091,345 A | | 5/1963 | Hoose et al. |
| 3,154,231 A | * | 10/1964 | Manetsch ............... 225/67 |
| 3,162,462 A | | 12/1964 | Elders |
| 3,245,165 A | * | 4/1966 | Podoloff ............... 40/591 |
| 3,252,434 A | | 5/1966 | Young, Jr. |
| 3,325,639 A | * | 6/1967 | King ............... 362/270 |
| 3,388,808 A | | 6/1968 | Radek |
| 3,506,138 A | | 4/1970 | Travis |
| 3,570,731 A | * | 3/1971 | Waltz ............... 225/38 |
| 3,589,746 A | | 6/1971 | Inglis et al. |
| 3,977,334 A | | 8/1976 | Carroll |
| 4,313,544 A | | 2/1982 | Ashton |
| 4,340,144 A | | 7/1982 | Cousins |
| 4,369,614 A | * | 1/1983 | Tetzner ............... B65B 11/025 |
| | | | 242/557 |
| 4,425,182 A | | 1/1984 | Jones et al. |
| 4,451,010 A | * | 5/1984 | Meyer ............... 242/599.2 |
| 4,525,235 A | | 6/1985 | Todisco |
| 4,595,107 A | | 6/1986 | Welsch |
| 4,616,756 A | | 10/1986 | Holtz |
| 4,634,077 A | * | 1/1987 | Wilson ............... B65H 49/20 |
| | | | 242/130 |
| 4,754,885 A | | 7/1988 | Rich |
| 4,787,513 A | * | 11/1988 | Auble ............... G03B 27/588 |
| | | | 206/407 |
| 4,832,298 A | | 5/1989 | Metcalf |
| 4,865,285 A | * | 9/1989 | Gaggianese ............... 248/309.4 |
| 4,953,879 A | | 9/1990 | Cain et al. |
| 4,986,555 A | | 1/1991 | Andreen |
| 5,042,737 A | * | 8/1991 | Sigle et al. ............... 242/423.1 |
| 5,137,158 A | * | 8/1992 | Brockway ............... 211/106.01 |
| 5,197,705 A | | 3/1993 | Baskas |
| 5,561,971 A | * | 10/1996 | Sampson ............... 53/556 |
| 5,568,864 A | * | 10/1996 | Nathan ............... 206/408 |
| 5,601,038 A | | 2/1997 | Welch et al. |
| D380,325 S | | 7/1997 | Kempf |
| 5,651,510 A | * | 7/1997 | Eble ............... B65H 54/106 |
| | | | 242/129 |
| 5,667,165 A | * | 9/1997 | Gardner ............... 242/588.2 |
| 5,887,731 A | | 3/1999 | Thalenfeld |
| 6,062,402 A | | 5/2000 | Ford |
| 6,135,299 A | | 10/2000 | Burgess |
| 6,237,307 B1 | * | 5/2001 | Zentmyer et al. ............... 53/399 |
| 6,241,107 B1 | | 6/2001 | Boyer |
| 6,299,001 B1 | | 10/2001 | Frolov et al. |
| 6,318,569 B1 | * | 11/2001 | Rothing ............... 211/90.01 |
| 6,364,137 B1 | | 4/2002 | Glauth et al. |
| 6,550,515 B2 | * | 4/2003 | Lavelle ............... 156/527 |
| 6,742,322 B2 | * | 6/2004 | Qicang ............... 53/588 |
| 6,846,196 B1 | | 1/2005 | Fallon |
| 6,886,794 B2 | | 5/2005 | Pollack |
| 6,920,742 B1 | * | 7/2005 | Yu Chen ............... 53/592 |
| 6,978,905 B2 | | 12/2005 | Chen |
| 7,152,748 B2 | | 12/2006 | Vosbikian |
| 7,213,821 B1 | | 5/2007 | Johnson |
| 7,229,085 B2 | | 6/2007 | Pederson et al. |
| 7,314,143 B1 | | 1/2008 | Johnson |
| 7,374,052 B2 | * | 5/2008 | Price et al. ............... 211/86.01 |
| 7,410,077 B2 | * | 8/2008 | Ness ............... B65D 85/671 |
| | | | 206/389 |
| 7,424,843 B2 | * | 9/2008 | Guillory ............... 83/614 |
| 7,448,634 B1 | | 11/2008 | Raub |
| 7,611,020 B2 | | 11/2009 | Prest |
| 7,815,202 B2 | | 10/2010 | Richards et al. |
| 7,823,844 B2 | | 11/2010 | Carnevali |
| 9,284,103 B2 | * | 3/2016 | Couchey ............... B65D 85/672 |
| 9,764,922 B2 | * | 9/2017 | Sharp ............... B65H 75/18 |
| 2004/0245199 A1 | | 12/2004 | Chen |
| 2006/0027983 A1 | | 2/2006 | Pederson et al. |
| 2007/0137454 A1 | * | 6/2007 | DesRosiers et al. ............... 83/614 |
| 2008/0143069 A1 | * | 6/2008 | Richards et al. ............... 280/47.35 |
| 2008/0296449 A1 | | 12/2008 | Carnevali |
| 2011/0290748 A1 | | 12/2011 | Wosoba et al. |
| 2012/0085714 A1 | | 4/2012 | Johnson |
| 2013/0014903 A1 | | 1/2013 | Johnson |
| 2015/0122684 A1 | * | 5/2015 | Couchey ............... B65D 85/672 |
| | | | 206/415 |
| 2015/0150422 A1 | * | 6/2015 | Ochoa, Sr. ............... A47K 10/16 |
| | | | 242/596.7 |

OTHER PUBLICATIONS

"Wireline.net—24" Wide Consumer Goods Shelf Display Rack" [online]. http://www.wireline.net, (captured Oct. 6, 2006 on the Internet Archive—http://archive.org) [retrieved on Jun. 1, 2012]. Retrieved from the Internet:<URL: http://www.wireline.net/browseproducts/24--Wide-Consumer-Goods-Shelf-Display-Rack---As-low-as-$34.05-ea!!!.HTML>; 2 pgs.

\* cited by examiner

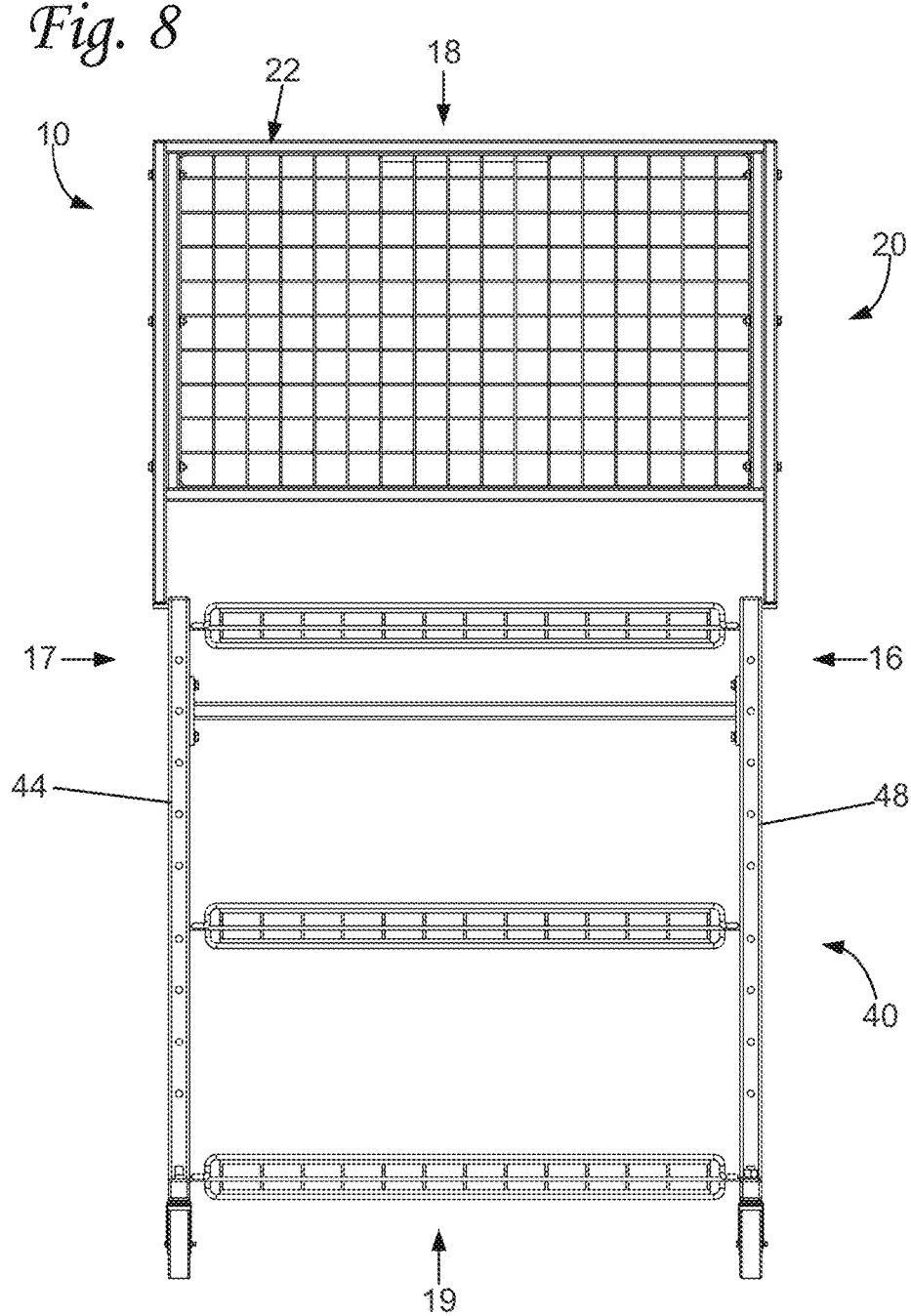

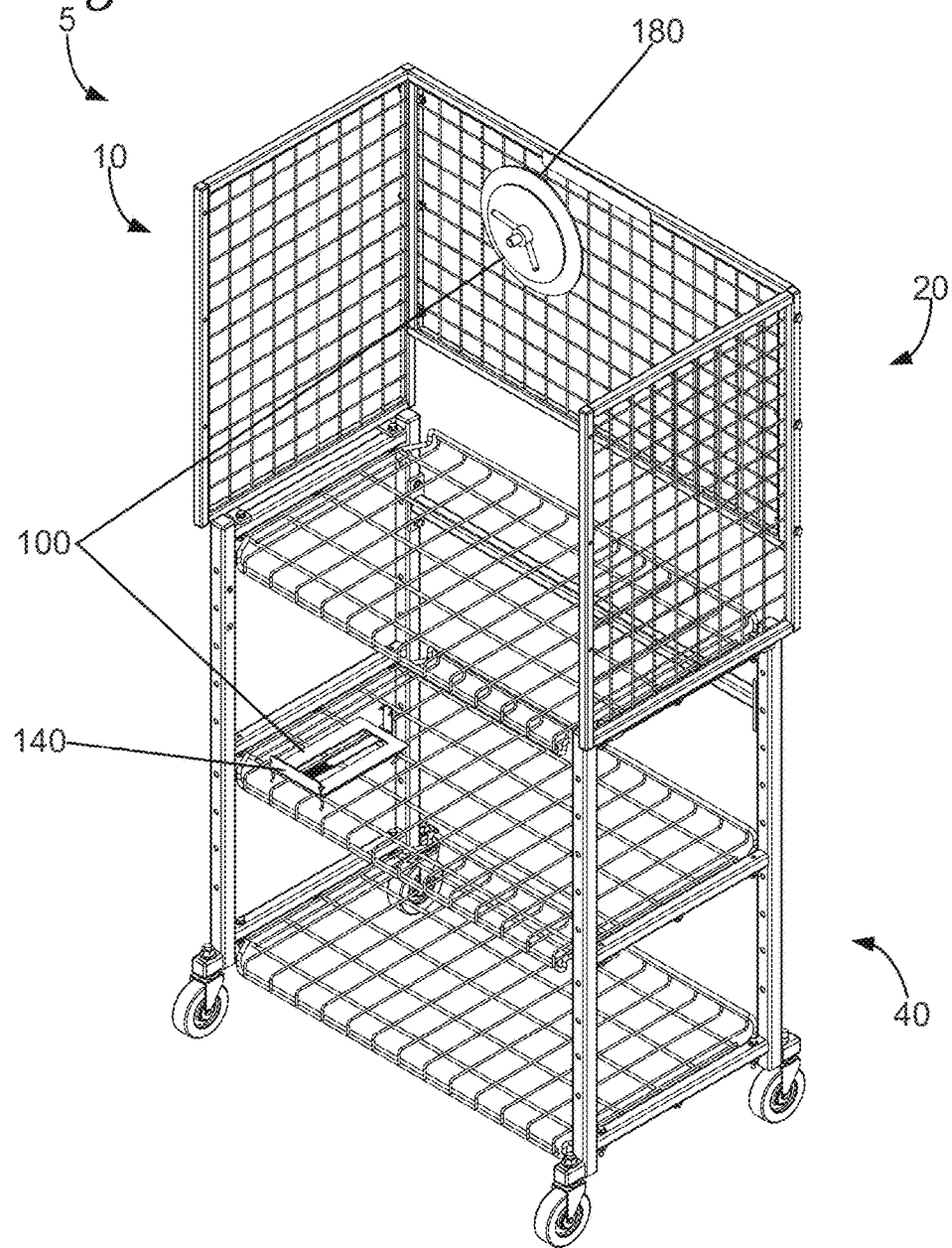

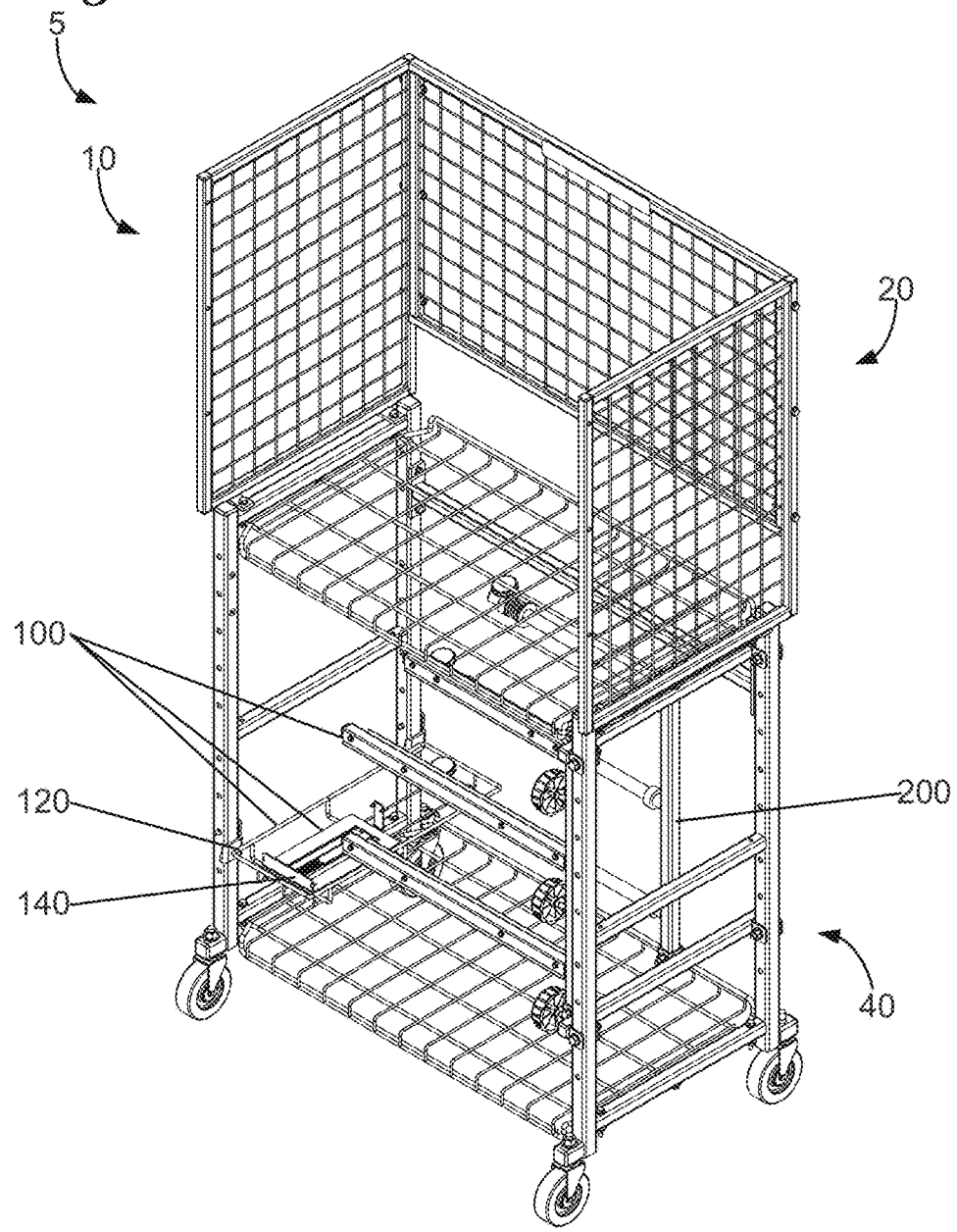

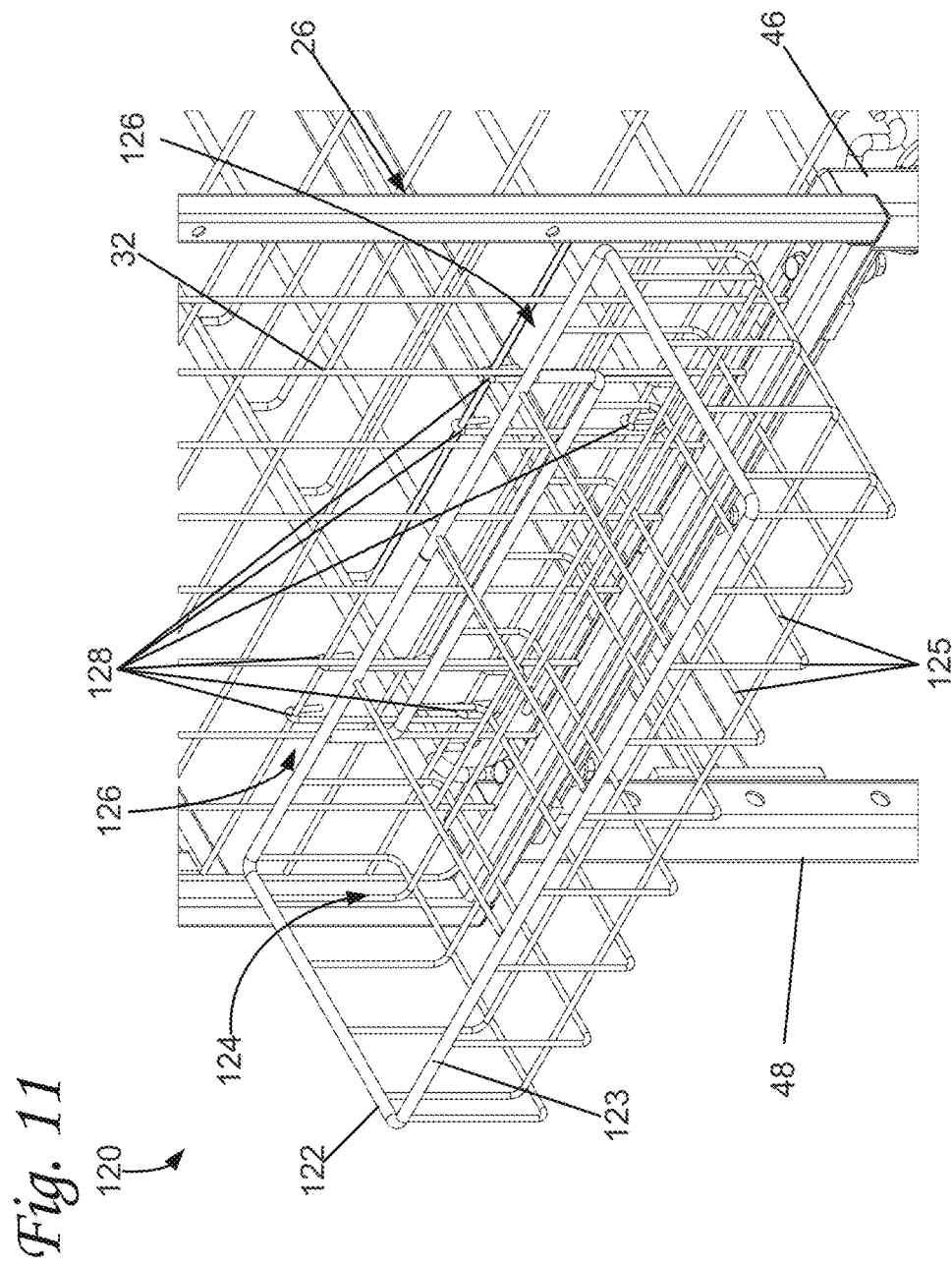

MATERIAL HOLDER

CROSS-REFERENCE TO RELATED APPLICATIONS

This application is a continuation-in-part of U.S. patent application Ser. No. 13/209,022, filed 12 Aug. 2011, entitled "WIRE-GRID WALLS FOR STANDS AND TOOL HOLDING APPARATUS," which claims the benefit of U.S. Provisional Application Ser. No. 61/391,427 filed 8 Oct. 2010, entitled "STAND INCLUDING WIRE-GRID WALLS," which are each incorporated herein by reference in their entireties.

BACKGROUND

The present disclosure relates generally to wire-grid walls for stands and tool holding apparatus (e.g., tool chests, etc.). More particularly, the present disclosure relates to wire-grid walls upon which material holding apparatus may be attached and used to hold various material, e.g., paint-masking material, polishes, paint guns, paper towels, tubes of adhesive, abrasive discs, grinding discs, rolls of sand paper, etc.

Material used in automotive repair, e.g., body repair, is often numerous and odd-sized. As such, the organization, accessibility, and mobility of such material may be challenging and time-consuming. Further, maintaining control of an inventory of material used in automotive repair may be ineffective and burdensome.

SUMMARY

Wire-grid apparatus (e.g., stands) may include various structures for holding material and/or material holding apparatus. For example, a stand may include a plurality of wire-grid walls oriented such that material holding apparatus (e.g., which is configured to hold material) may be attached to either side of the wire-grid walls and remain accessible to a user.

In one embodiment of a stand for holding material over a ground surface, the stand may define a front side, a rear side, a left side, a right side, and a top side and may include an upper portion and a lower portion. The upper portion may include a first wire-grid wall located on the rear side of the stand and extending between the left side and the right side of the stand, a second wire-grid wall located on the left side of the stand and coupled to the first wire-grid wall, and a third wire-grid wall located on the right side of the stand and coupled to the first wire-grid wall.

Each of the first, second, and third wire-grid walls may include a grid of wire lying in a plane configured to receive material holding apparatus on either side of the grid of wire and a frame extending around the grid of wire. Further, each of the first, second, and third wire-grid walls may be perpendicular to the ground surface. Still further, in at least one embodiment, the grid of wire of each of the first, second, and third wire-grid walls may define a plurality of square openings and each of the plurality of square openings may define an area greater than 4 square inches.

At least in one embodiment, the top side of the stand and the front side of the upper portion of the stand may be open and unobstructed. For example, the top side of the stand and front side of the upper portion may be open and obstructed to allow for material, material holding apparatus, and other various apparatus to extend beyond the topmost portions of the stand and to allow light from overhead sources to enter the stand to assist visual identification of material, material holding apparatus, and/or other various apparatus located on or within the stand.

The lower portion may be positioned to support the upper portion above the ground surface and may include a first, second, third, and fourth lower support. member and at least one lower shelf extending between the first, second, third, and. fourth lower support members. Each of the first, second, third, and fourth lower support members may be parallel to each other and may be located at a different one of four corners of the lower portion. Further, at least a portion of the at least one lower shelf may include a grid of wire lying in a plane parallel to the ground surface and configured to receive material holding apparatus.

At least in one embodiment, each of the first, second, third, and fourth lower support members may extend from a lower end to an upper end along an axis and may define a plurality of openings extending through the lower support member in a direction transverse to the axis.

In one embodiment of a system for holding material over a ground surface, the system may include a plurality of material holding apparatus and a stand.

Each of the plurality of material holding apparatus may be configured to hold one or more materials and may include identification apparatus configurable to identify the material to be held by the respective material holding apparatus.

The stand of the system may define a front side, rear side, a left side, and a right side and may include a lower portion and an upper portion. The upper portion may include a first wire-grid wall located on the rear side of the stand and extending between the left side and the right side of the stand, a second wire-grid wall located on the left side of the stand and coupled to the first wire-grid wall, and a third wire-grid wall located on the right side of the stand and coupled to the first wire-grid wall.

Each of the first, second, and third wire-grid walls may include a grid of wire lying in a plane configured to receive one or more of the plurality of material holding apparatus on either side of the grid of wire and a frame extending around the grid of wire. The grid of wire may include a first set of wire and a second set of wire. Further, each of the first, second, and third wire-grid walls may be perpendicular to the ground surface.

Each wire of the first set of wire may extend parallel to each other, and each wire of the first set of wire may be spaced equidistantly from each adjacent wire of the first set of wire, Further, each wire of the second set of wire may extend parallel to each other and perpendicular to each wire of the first set of wire, and each wire of the second set of wire may be spaced equidistantly from each adjacent wire of the second set of wire.

The lower portion is positioned to support the upper portion above the ground surface and may include a first, second, third, and fourth lower support member and at least one lower shelf extending between the first, second, third, and fourth lower support members.

Each of the first, second, third, and fourth lower support members may be parallel to each other and may be located at a different one of four corners of the lower portion. Further, at least a portion of the at least one lower shelf may include a grid of wire lying in a plane parallel to the ground surface and configured to receive one or more of the plurality of material holding apparatus. Still further, the top side of the stand may be open and unobstructed and the front side of the upper portion of the stand may be open and unobstructed.

At least in one embodiment, the plurality of holding apparatus includes at least one of a hook, disc holder, basket shelf box holder, and side-mountable material holder, An exemplary hook may include at least one elongate member extending from a proximal end to a distal end and attachment apparatus coupled to the distal end of the at least one elongate member. The attachment apparatus may include at least two U-shape members and each of the at least two U-shape members may be configured for attachment to a different horizontal wire of the grid of wire of one of the first, second, and third wire-grid walls to support the at least one elongate member extending outwardly from the grid of wire.

An exemplary disc holder may include a first plate defining a front side and a rear side, an elongate member perpendicular to the front side of the first plate, attachment apparatus coupled to the rear side of the first plate, and a second plate defining a front side and a rear side. The attachment apparatus may include at least two U-shape members and each of the at least two U-shape members may be configured for attachment to a. different horizontal wire of the grid of wire of one of the first, second, and third wire-grid walls to support the first plate parallel to the grid of wire.

The second plate may further define an opening configured to receive the elongate member. The disc holder may be configured to receive an abrasive disc defining an opening between the front side of the first plate and the rear side of the second plate with the elongate member extending through the opening of the abrasive disc and to apply pressure to the abrasive disc to maintain the flatness of the abrasive disc.

An exemplary basket shelf may include a basket formed of wire and attachment apparatus coupled to the basket. The attachment apparatus may include at least two U-shape members, and each of the at least two U-shape members may be configured for attachment to a different horizontal wire of the grid of wire of the first, second, and third wire-grid walls to support the basket extending from the grid of wire.

An exemplary box holder may include a body, attachment apparatus, and a retention member. The body may include a planar base extending from a first end to a second end and may define a first surface and a second surface opposite the first surface and a stop member proximate the first end of the planar base (e.g., extending from the first surface of the planar base). The stop member may include at least two barbs.

The attachment apparatus may be coupled to the second surface of the planar base and may include at least two U-shape members. Each of the at least two U-shape members may be configured for attachment to a grid of wire.

The retention member may be movably coupled to the body and may include at least two barbs extending towards the stop member. The retention member may be biased towards the stop member to retain a box located between at least a portion of the retention member and at least a portion of the stop member.

An exemplary side-mountable material holder may include a frame couplable to the stand (e.g., to the lower support members of the lower portion) and material holding apparatus coupled to the frame and configured to hold at least one roll of material (e.g., masking material, etc) vertically.

In another embodiment of a stand for holding material over a ground surface, the stand may include an upper portion and a lower portion. The upper portion may include a first, second, and third wire-grid wall.

Each of the first, second, and third wire-grid walls may include a grid of wire lying in a plane configured to receive material holding apparatus on either side of the grid of wire and a frame extending around the grid of wire.

The first wire-grid wall may be coupled to a first end of the third wire-grid wall and the second wire-grid wall may be coupled to a second end of the third wire-grid wall opposite the first end such that each of the first and second wire-grid wall are perpendicular to the third wire-grid wall. Further, each of the first, second, and third wire-grid walls may be perpendicular to the ground surface.

The lower portion is positioned to support the upper portion above the ground surface. The lower portion may include a first, second, third, and fourth lower support member, a first cross member, a second cross member, and at least one lower shelf.

Each of the first, second, third, and fourth lower support members may extend from a bottom end to a top end. The first cross member may interconnect the first lower support member and the second lower support member such that the first lower support member is substantially parallel to the second lower support member and defines a first plane in which the first cross member and the first and second support members lie. The second cross member may interconnect the third lower support member and the fourth lower support member such that the third lower support member is substantially to the fourth lower support member and defining a second plane in which the second cross member and the third and fourth support members lie.

The at least one lower shelf may extend between the first plane and the second plane and may include a grid of wire lying in a plane parallel to the ground surface and configured to receive material holding apparatus.

In at least one embodiment, the lower portion of stand further includes a third cross member interconnecting the second lower support member and the fourth lower support member such that the second lower support member is substantially parallel to the fourth lower support member and defines a third plane in which the third cross member and the second and fourth support members lie.

In one embodiment of a wire-grid apparatus, the wire-grid apparatus may be couplable to a tool holding apparatus (e.g., a tool chest, etc.). The tool holding apparatus may include at least two metal sides, a surface, and a flange extending above the surface about a portion of a perimeter of the surface adjacent the two metal sides. The exemplary -wire-grid apparatus may include a first wire-grid wall and a second wire-grid wall, each extending from a first end to a second end. The second end of the first wire-grid wall may be coupled to the first end of the second wire-grid wall such that the first wire-grid wall is perpendicular to the second wire-grid wall. Each of the first and second wire-grid walls may be perpendicular to the surface of the tool holding apparatus when coupled thereto.

Further, each of the first and second wire-grid walls may include a grid of wire, a frame, and at least one retention structure. The grid of wire lying in a plane may be configured to receive material holding apparatus on either side of the grid of wire. The frame may extend around a plurality of edges of the grid of wire. The at least one retention structure may be coupled to the frame along a portion of at least one edge of the grid of wire and may be configured to couple the wire-grid wall to at least a portion of the flange of the tool holding apparatus.

In at least one embodiment of the wire-grid apparatus, the at least one retention structure may include an elongate member, magnetic material, and one or more flanges. The elongate member may extend from a proximal end to a distal end and the proximal end may be coupled to the frame. When the wire-grid wall is coupled to the tool holding apparatus, the elongate member may extend below the surface thereof.

The magnetic material may be coupled to the distal end of the elongate member and may be configured to couple the wire-grid wall to one of the metal sides of the tool holding apparatus. The one or more flanges may extend along at least a portion of the at least one edge and may be configured to be located proximate the flange of the tool holding apparatus to assist in the coupling when the wire-grid wall is coupled to the tool holding apparatus. Further, the one or more flanges may include a pair of flanges configured to lie on opposite sides of the flange of the tool holding apparatus to assist in the coupling when the wire-grid wall is coupled to the tool holding apparatus.

An exemplary material holder for use with a structure may include a frame (e.g., a frame including an elongate member extending from a lower end portion to an upper end portion) couplable to the structure, material holding apparatus coupled to the frame and configured to hold at least one roll of material vertically, material retention apparatus configured to selectively retain the at least one roll of material, and frame retention apparatus coupled to the frame and configured to couple the frame to the structure (e.g., a stand). The material retention apparatus may be selectively configurable in at least an open configuration and a closed configuration. The at least one roll of material may be removable when the material holding apparatus is in the open configuration, and the at least one roll of material may be retained when the material holding apparatus is in the closed configuration.

Another exemplary material holder for use with a structure may include a frame removably couplable to the structure and material holding apparatus coupled to the frame. The material holding apparatus may include a box holder configured to support a box containing at least one roll of material. The box holder may include a lower box support portion configured to support a bottom end of the box and an upper box support portion configured to support a top end of the box. The lower box support portion may be fixedly coupled to the frame and the upper box support portion may be movably coupled to the frame.

In one or more embodiments, the frame retention apparatus further may include at least one magnetic material portion (e.g., at least four magnetic material portions) couplable to a metal surface of the structure and at least one elongate portion extending from a proximal end region to a distal end region. The proximal end region may be coupled to the frame and the distal end region may be coupled to the at least one magnetic material portion.

In one or more embodiments, the material holding apparatus may include a lower support disc coupled to the frame and configured to support the at least one roll of material vertically thereon. Further, the material holding apparatus may include a lower spindle portion coupled to the frame and configured to extend into a center opening of the at least one roll of material. In one or more embodiments, the material holding apparatus may include an upper spindle portion coupled to the frame and configured to extend into a center opening of the at least one roll of material.

In one or more embodiments, the material holding apparatus may include a box holder configured to support a box containing the at least one roll of material. Further, the box holder may include a lower box support portion configured to support a bottom end of the box and an upper box support portion configured to support a top end of the box.

In one or more embodiments, the material holder may include at least one tear member configured to allow a user to tear material. from the at least one roll of material by pulling the material across the tear member.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 8 is a rear view of the stand of FIG. 2.

FIG. 9 is a perspective view of the stand of FIG. 2 with exemplary material holding apparatus.

FIG. 10 is a perspective view of the stand of FIG. 2 with different exemplary material holding apparatus than shown in FIG. 9.

FIG. 11 is a perspective view of an exemplary basket shelf attached to a wire-grid wall of the stand of FIG. 2.

DETAILED DESCRIPTION OF EXEMPLARY EMBODIMENTS

Figure 1:
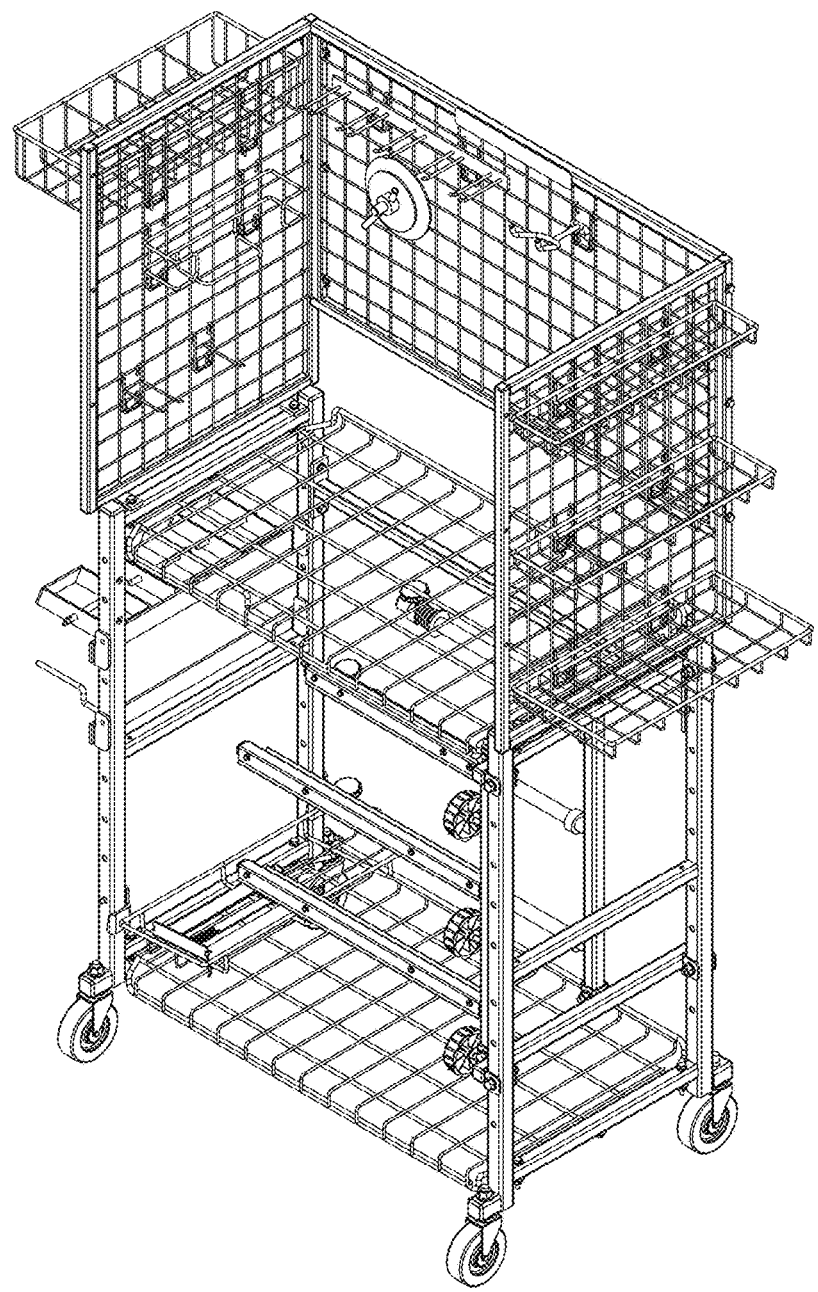
FIG. 1 is a perspective view of an exemplary system for holding material including a stand and material holding apparatus.
Figure 2:
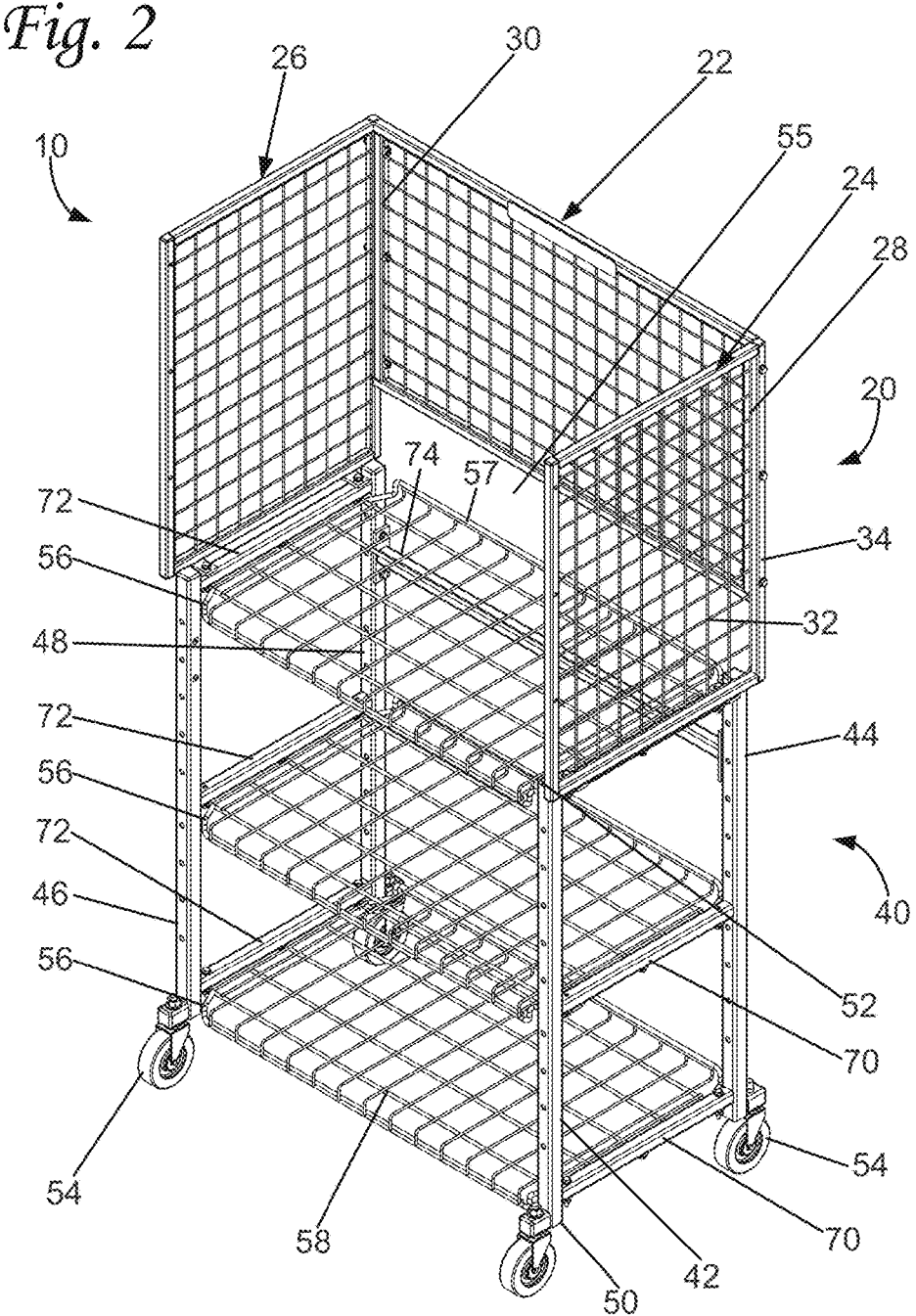
FIG. 2 is a perspective view of an exemplary stand for holding material.
Figure 3:
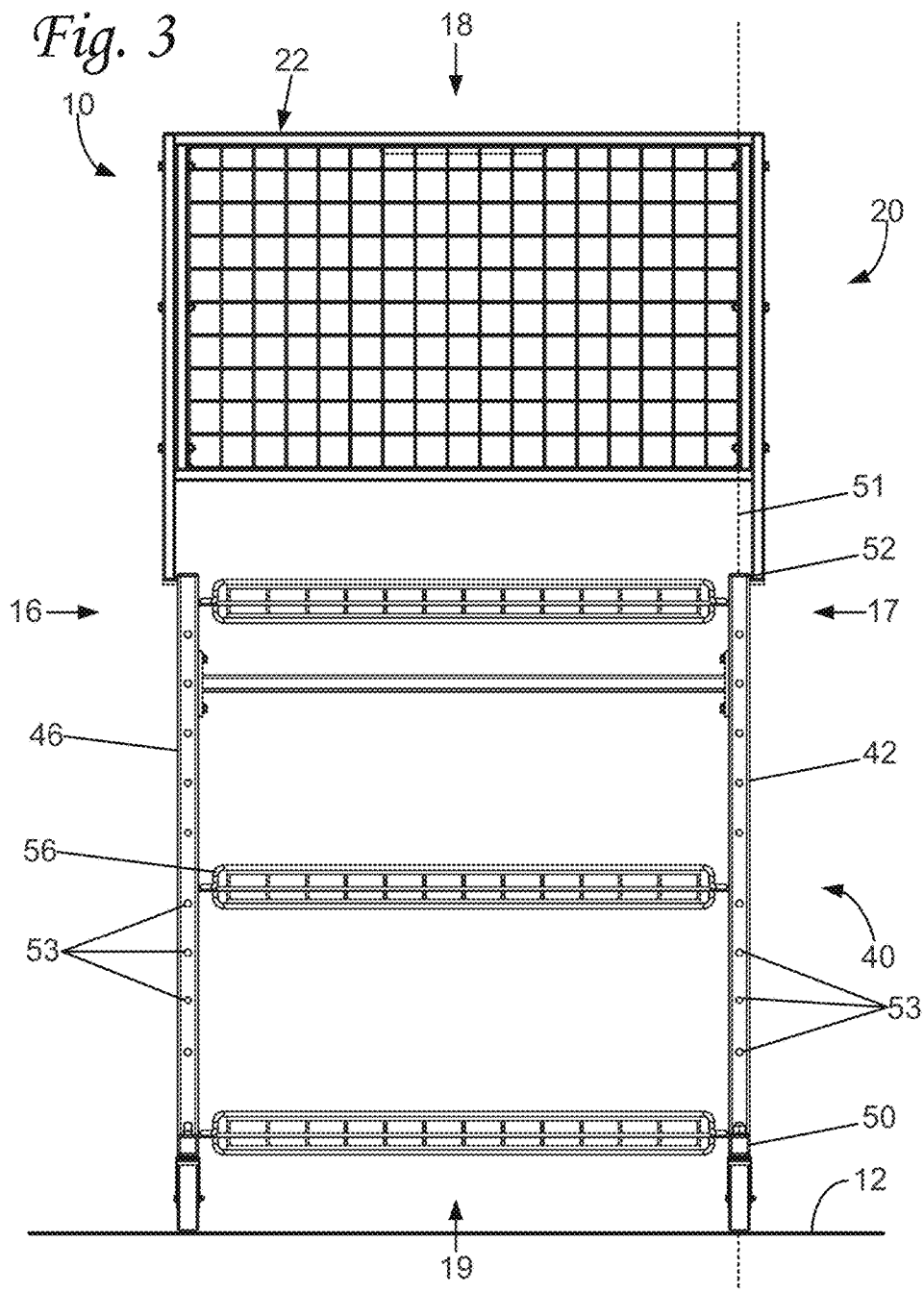
FIG. 3 is a front view of the stand of FIG. 2.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus and systems shall be described with reference to FIGS. 1-31. It will be apparent to one skilled in the art that elements from one embodiment may be used in combination with elements of the other embodiments, and that the possible embodiments of such apparatus and systems using combinations of features set forth herein is not limited to the specific embodiments shown in the Figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

An exemplary embodiment of a stand 10 for holding material above a. ground surface 112 is depicted in FIGS. 2-10. Generally, the stand 10 includes an upper portion 20 and a lower portion 40 and defines a front side 14, a rear side 15, a left side 16, a right side 17, a top side 118, and a bottom side 19 (e.g., as labeled in FIGS. 3-8). The lower portion 40 may be positioned to support the upper portion 10 above the ground surface 12 (see FIG. 3). In the embodiment depicted in the Figures, the upper portion 20 is bolted to the lower portion 40. However, the upper portion 20 and the lower portion 40 may be removably or fixedly coupled to each other by any method (e.g., welding) as would be known by one having skill in the art.

The lower portion 40 may include a plurality of lower support members. In the embodiment depicted, the lower portion 40 includes a first lower support. member 42, a second lower support member 44, a third lower support member 46, and a fourth lower support member 48. The lower support members 42, 44, 46, 48 may be parallel to each other and located at a different one of four corners of the lower portion (e.g., each of the four corners may be located proximate the intersections of the front side 14, rear side 15, left side 16, and right side 17). Each lower support member 42, 44, 46, 48 extends from a bottom end 50 to atop end 52 along an axis 51 (labeled in reference to lower support member 42 in FIG. 3). Wheels 54 (e.g., lockable casters, rollable platform, etc.) or any other apparatus for making the stand 10 movable may be optionally attached to the lower portion 40, e.g., proximate the bottom end 50 of the lower support members 42, 44, 46, 48, to engage the ground surface 12 to support the stand 10 and allow it to be moved over the ground surface 12. Further, the lower support members 42, 44, 46, 48 include a plurality of openings 53 that extend therethrough traverse to the axis 51 such that one Or more various material holding apparatus, shelves, or other accessories may be attached to the lower support members 42, 44, 46, 48 using such openings 53.

The lower portion 40 may include one or more cross members extending between the lower support members 42, 44, 46, 48. As shown, three cross members 70 extend between the first and second lower support members 42, 44 thereby interconnecting the first and second lower support members 42, 44 such that the first lower support member 42 is substantially parallel the second lower support member 44. Together, the cross members 70 and the first and second lower support members 42, 44 lie in a plane. In other words, the cross members 70 and the first and second lower support members 42, 44 define a plane.

In similar fashion, three cross members 72 extend between the third and fourth lower support members 46, 48 (e.g., the cross members 72 and third and fourth lower support members 46, 48 also lie in and define a plane). Although three cross members are depicted extending between each of the first and second lower support members 42, 44 and the third and fourth lower support members 46, 48, one or more cross members (or none) may interconnect each of the first and second lower support members 42, 44 and the third and fourth lower support members 46, 48.

Further, the lower portion 40 may include an additional cross member 74 extending between the second tower support member 42 and the fourth lower support member 48 on the rear side 15 of the stand 10. Similar to the cross members 70, 72, one or more cross members (or none) may interconnect the second and fourth lower support members 42, 48. In the embodiment depicted in the Figures, the cross members 70, 72, 74 are bolted to the tower support members 42, 44, 46, 48. The cross members 70, 72, 74, however, may be coupled to any portion of the lower portion 40 by any method (e.g., welding) as would be known by one having skill in the art.

At least one shelf 56 may extend between the tower support members 42, 44, 46, 48. A portion of or the entire shelf(s) 56 may be formed of a grid of wire 58 (see FIG. 6) lying in a plane parallel to the ground surface 12 (e.g., when the stand 10 is located on the ground surface 12). The grid of wire 58 may include a first set of wire 60 within which each wire extends parallel to each other and is spaced equidistantly from each adjacent parallel wire of the first set of wire 60 and a second set of wire 62 within which each wire also extends parallel to each other and is spaced equidistantly from each adjacent parallel wire of the second set of wire 62. In other words, the space between each adjacent wire of the first set of wire 60 is equal and the space between each adjacent wire of the second set of wire 62 is also equal. Further, although each set of wires 60, 62 are described as having wire that is spaced equidistantly from each adjacent parallel wire, spacing between the first set of wire 60 may be different (e.g., larger or smaller) than the spacing between the second set of wire 62, or the spacing may be equal or identical. The first set of wire 60, as shown, is arranged perpendicular to the second set of wire 62 forming the grid of wire 58 and is configured to receive one or more various material holding apparatus described herein. Further, in at least one embodiment, each wire of each set of wire 60, 62 may not be spaced equidistantly from each adjacent wire. For example, each set of wire 60, 62 may have multiple different spacings between each adjacent wire.

The diameter of the wire of each set of wire 60, 62 may he about one sixteenth of an inch, about one eighth of an inch, about one quarter of an inch, etc. Further, each set of wire 60, 62 may have a different or the same diameter. In at least one embodiment, wire 62 may have a diameter of about one quarter of an inch while wire 60 may have a diameter of about one eighth of an inch.

The grid of wire 58 may define a plurality of rectangular openings 59 between the wires. Each of the openings 59 may define an area of about 1 square inch to about 8 square inches (e.g., greater and/or less than about 1 square inch, about 2 square inches, about 4 square inches, about 6 square inches, about 8 square inches, etc). In at least one embodiment, the openings 59 define an area having a perimeter of 2 inches by 3 inches, i.e., 6 square inches.

In the embodiment depicted in the Figures, the shelves 56 are bolted to cross members 70, 72. However, the shelves 56 may be coupled to and/or supported by any portion of the lower portion 40 by any method (e.g., welding) as would be known by one having skill in the art. Further, at least in one embodiment, the shelves 56 include a rear portion 57 that extends upwardly, e.g., to stop material located on the shelf 56 from falling from the rear side 15 of the stand 10.

The lower portion 40 may support the upper portion 20 above, or off, the ground surface 12. Generally, the upper portion 20 may include a first, a second, and a third wire-grid wall 22, 24, 26. The first wire-grid wall 22 is located on the rear side 15 of the stand 10 and may extend between the left side 16 and the right side 17 of the stand 10.

The second wire-grid wall 24 is located on the right side 17 of the stand 10 and may extend between the rear side 15 and the front side 14 of the stand 10. The second wire-grid wall 24 may be coupled to the first wire-grid wall 22, e.g., proximate the corner of the upper portion 20 of the stand 10 formed by right side 17 and rear side 15.

The third wire-grid wall 26 is located on the left side 16 of the stand 10 and may extend between the rear side 15 and the front side 14 of the stand 10. The third wire-grid wall 26 may be coupled to the first wire-grid wall 22, e.g., proximate the corner of the upper portion 20 of the stand 10 formed by left side 16 and rear side 15.

In other words, the first wire-grid wall 22 may extend from a first end 28 to a second end 30, and the second wire-grid wall 24 may be coupled to the first end 28 and the third wire-grid wall 26 may be coupled to the second end 30. The wire-grid walls 22, 24, 26 may be arranged such that each of the second and third wire-grid walls 24, 26 are both parallel to each other and perpendicular to the first wire-grid wall 22, Further, each of the wire-grid walls 22, 24, 26 may be perpendicular to the ground surface 12 when the stand 10 is located on the ground surface 12. In other words, each of the wire-grid walls 22, 24, 26 may be described as being vertically oriented.

Figure 4:
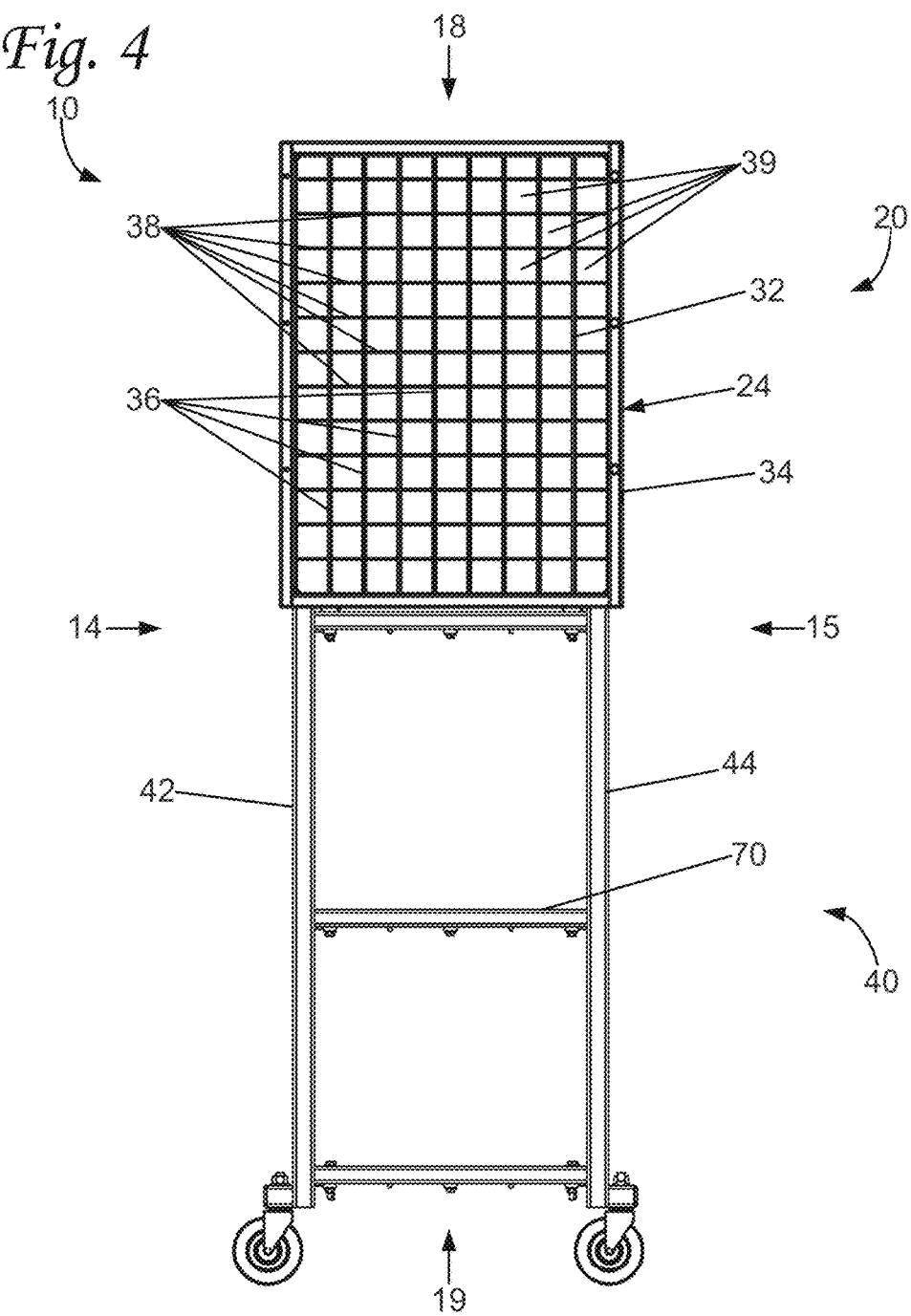
FIG. 4 is a right-side view of the stand of FIG. 2.
Figure 5:
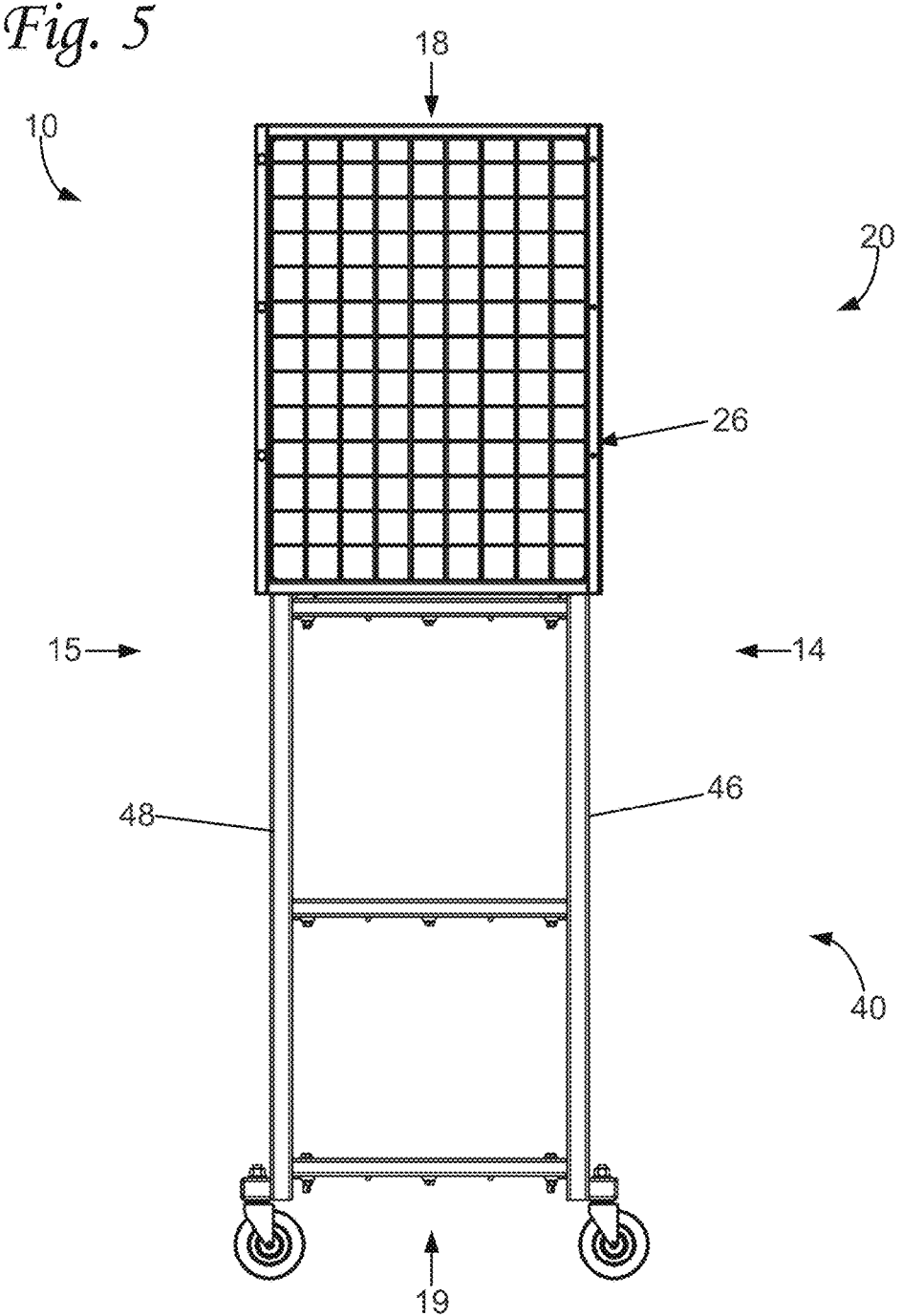
FIG. 5 is a left-side view of the stand of FIG. 2.
Figure 6:
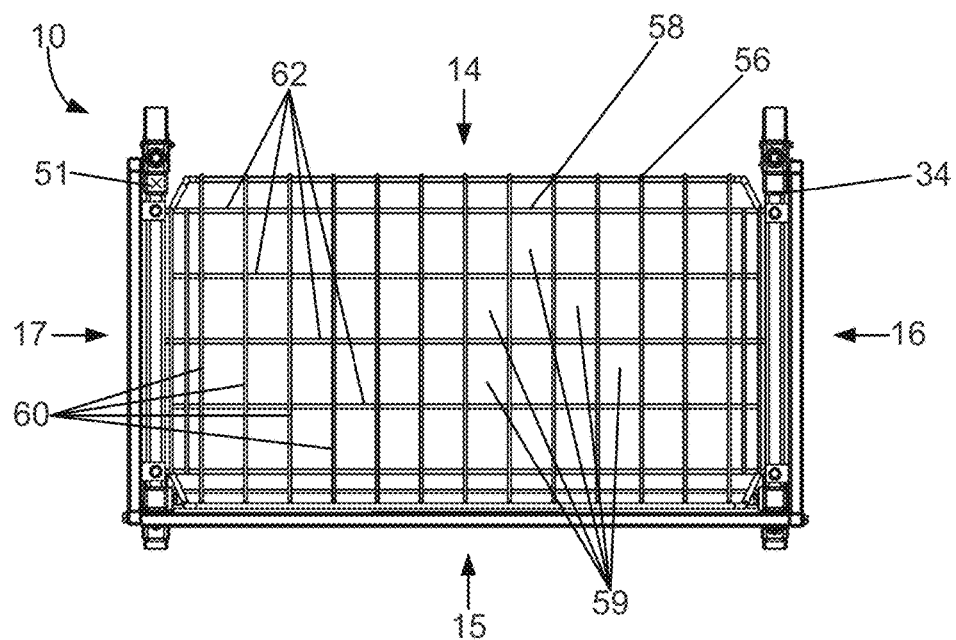
FIG. 6 is a top view of the stand of FIG. 2.
Figure 7:
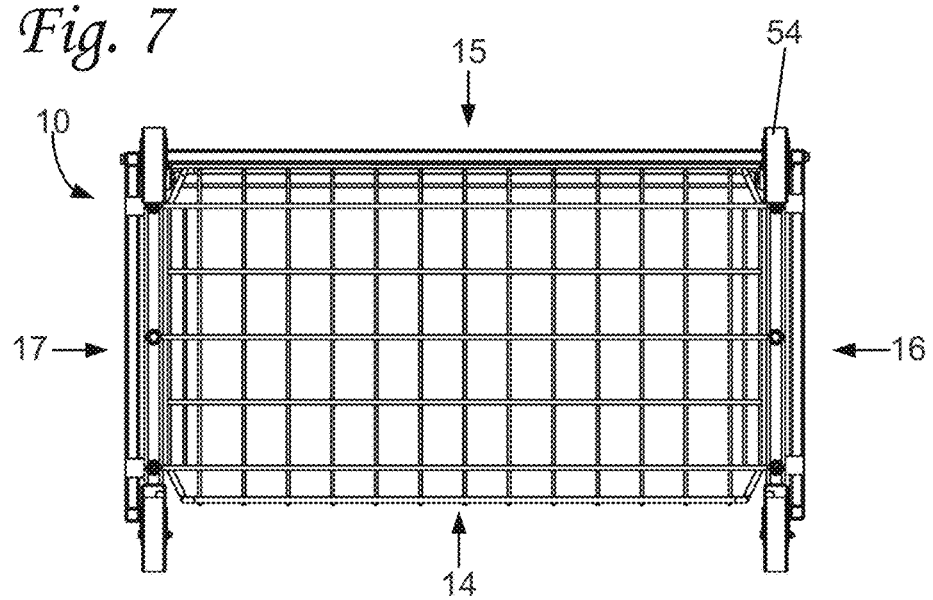
FIG. 7 is a bottom view of the stand of FIG. 2.

Each of the wire-grid walls 22, 24, 26 may include a grid of wire 32 and a frame 34 extending around the grid of wire 32 (labeled with respect to the second wire-grid wall 24 in FIG. 4). The grid of wire 32 may substantially lie in a plane and may be configured to receive material holding apparatus and/or other accessories on either side of the grid of wire 32 (e.g., the material holding apparatus may be located on either side of the plane in which the grid of wire lies). In other words, the grid of wire 32 of each of the wire-grid walls 22, 24, 26 defines a plane that is vertically oriented (e.g., each plane defined by the wire-grid walls 22, 24, 26 may be perpendicular to a horizontal ground surface 12 when the stand 10 is located on the ground surface 12). The frame 34 may extend completely around the grid of wire 32 or only around a portion of the grid wire 32. Further, in at least one embodiment, each wire-grid wall 22, 24, 26 may not include a frame 34. The grid of wire 32 may be attached to the frame 34 by any method (e.g., welding) as would be known by one having skill in the art.

More specifically, the grid of wire 32 includes a first set of wire 36 and a second set of wire 38. Each wire of the first set of wire 36 extends parallel to each other and is spaced equidistantly from each adjacent parallel wire of the first set of wire 36 and each wire of the second set of wire 38 also extends parallel to each other and is spaced equidistantly from each adjacent parallel wire of the second set of wire 38. In other words, the space between each adjacent wire of the first set of wire 36 is equal and the space between each adjacent wire of the second set of wire 38 is also equal. Further, although each set of wires 36, 38 are described as having wire that is spaced equidistantly from each adjacent parallel wire, spacing between the first set of wire 36 may be different (e.g., larger or smaller) than the spacing between the second set of wire 38, or the spacing may be equal or identical. The first set of wire 36, as shown, is arranged perpendicular to the second set of wire 38 forming the grid of wire 32. The grid of wire 32 may be further configured to receive one or more various material holding apparatus described herein.

In at least one embodiment, each wire of each set of wire 36, 38 may not be spaced equidistantly from each adjacent wire. For example, each set of wire 36, 38 may have multiple different spacings between each adjacent wire. Still further, the grid of wire 32 may be similar or different than the grid of wire 58 of the shelf 56 (e.g., same or different size wire, spacings, arrangement, etc.).

The diameter of the wire of each set of wire 36, 38 may be about one sixteenth of an inch, about one eighth of an inch, about one quarter of an inch, etc. Further, each set of wire 36, 38 may have the same or a different diameter. In at least one embodiment, both sets of wire 36, 38 may have a diameter of about one eighth of an inch.

As shown, the first set of wire 36 may be described has vertically-oriented, or vertical, because each wire of the first set of wire 36 extends perpendicular to the ground surface 12 (e.g., a horizontal ground surface) when the stand 10 is located on the ground surface 12. Further, the second set of wire 38 may be described has horizontally oriented, or horizontal, because each wire of the second set of wire 38 extends parallel to the ground surface 12 when the stand 10 is located on the ground surface 12.

The grid of wire 32 defines a plurality of rectangular openings 39. Each of the openings 39 may define an area of about 1 square inch to about 8 square inches (e.g., greater and/or less than about 1 square inch, about 2 square inches, about 4 square inches, about 6 square inches, about 8 square inches, etc.). For example in at least one embodiment, the openings 59 define an area having a perimeter of 2 inches by 2 inches, i.e., 4 square inches.

Due, in part, to the spacing and arrangement of the wire of the grid of wire 32 of the wire-grid walls 22, 24, 26, the stand 10 may be described as being visually open such that various apparatus may be visually identified wherever they may be located within or on the stand 10 (e.g., attached to either side of any of the wire-grid walls 22, 24, 26, etc.). In other words, the wire-grid walls 22, 24, 26 promote visibility of the material, material holding apparatus, and/or other various apparatus located on or within the stand.

Further, the top side 18 of the stand 10 may not include any structures such that it may be described as being open and unobstructed, e.g., to allow for material, material holding apparatus, and/or other various apparatus to extend beyond the topmost portions of the stand 10 and to allow light from overhead sources to enter the stand 10 to assist visual identification of material, material holding apparatus, and/or other various apparatus located on or within the stand 10. Still further, the front side 14 of the stand 10 (e.g., the entire front side 14 of the stand 10 or a portion thereof such as the upper portion 20) may not include any structures such that it is open and unobstructed for similar reasons described herein with reference to the top side 18 of the stand 10. Yet still further, the stand 10 may define an opening 55 located proximate the rear side 15 of the stand 10, e.g., as shown, defined, in part, by a lower portion of the wire-grid wall 22 and the rear portion 57 of the uppermost shelf 56.

The elements of the stand 10 may be formed of any material steel, aluminum, a polymer, etc.) as would be known by one having skill in the art. Further, such elements may be hollow, solid, circular, square, and/or any other shape, size, or configuration as would be known by one having skill in the art.

The stand 10 when used in conjunction with one or more material holding apparatus 100 may be described as an exemplary system 5 for holding material over a ground surface 12 as depicted in FIG. 1. In other words, the exemplary system 5 includes the stand 10 of FIG. 2 and a plurality of material holding apparatus 100.

The material holding apparatus 100 may be defined as any apparatus attachable (e.g., removably attachable) to the stand 10 (e.g., the wire-grid walls 22, 24, 26, shelves 56, lower support members 42, 44, 46, 48, etc.) and configured to hold one or more materials (e.g., paint-masking material, polishes, paint guns, paper towels, tubes of adhesive, abrasive discs, grinding discs, rolls of sand paper, etc.) above the ground surface 12. Exemplary material holding apparatus 100 includes a hook 110, a basket shelf 120, a disc holder 180, a box holder 140, a masker 200, side-mounted material holder 300, etc.

Figure 17:
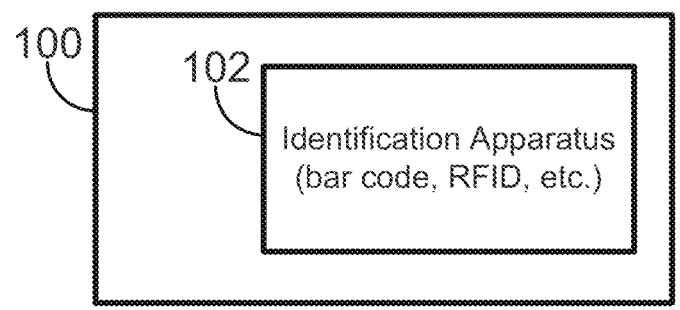
FIG. 17 is a diagrammatic representation of an exemplary material holding apparatus.
Figure 18:
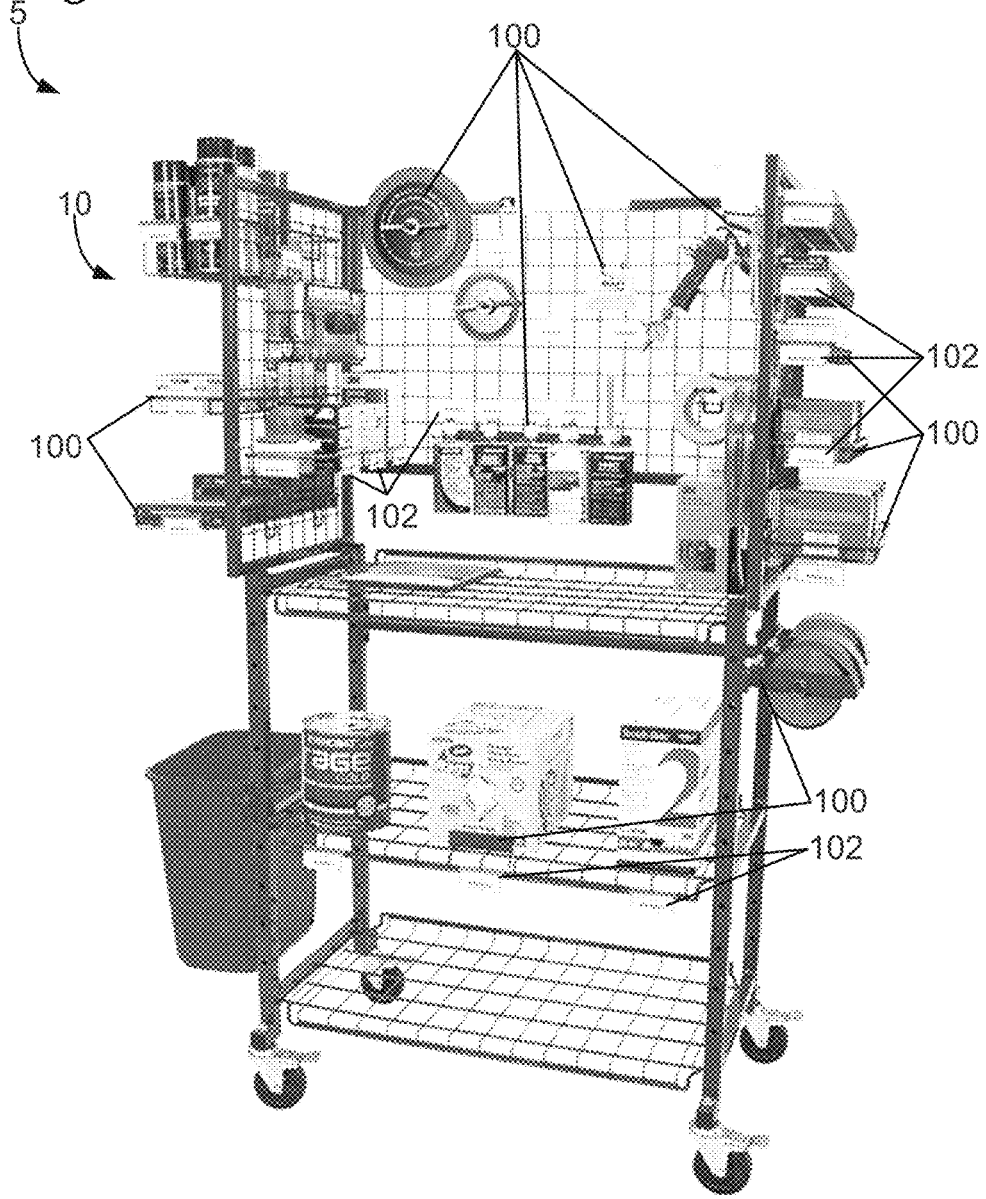
FIG. 18 is a photograph of an exemplary system for holding material including a stand and material holding apparatus.
Figure 19:
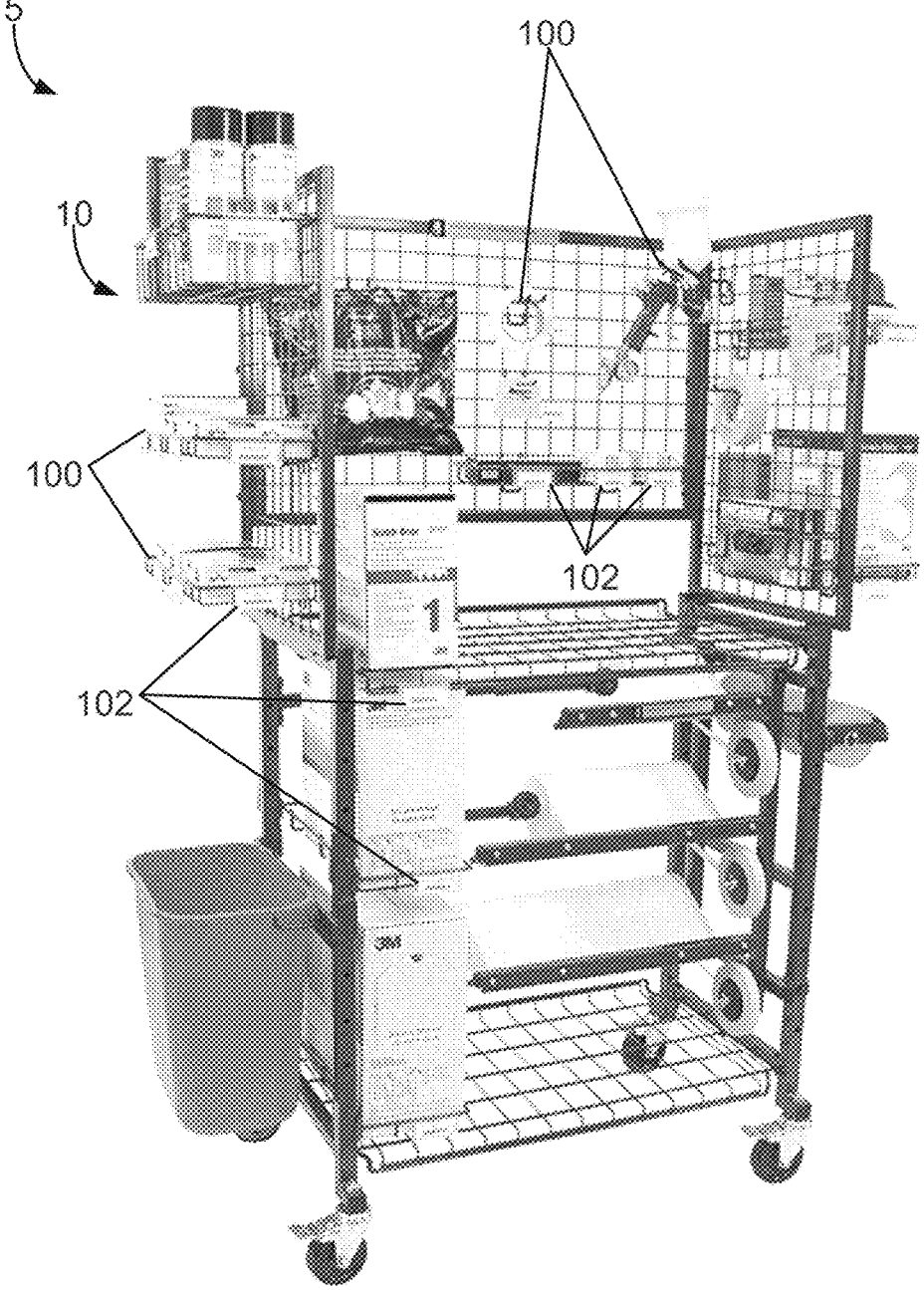
FIG. 19 is a photograph of another exemplary system for holding material including a stand and material holding apparatus.
Figure 20:
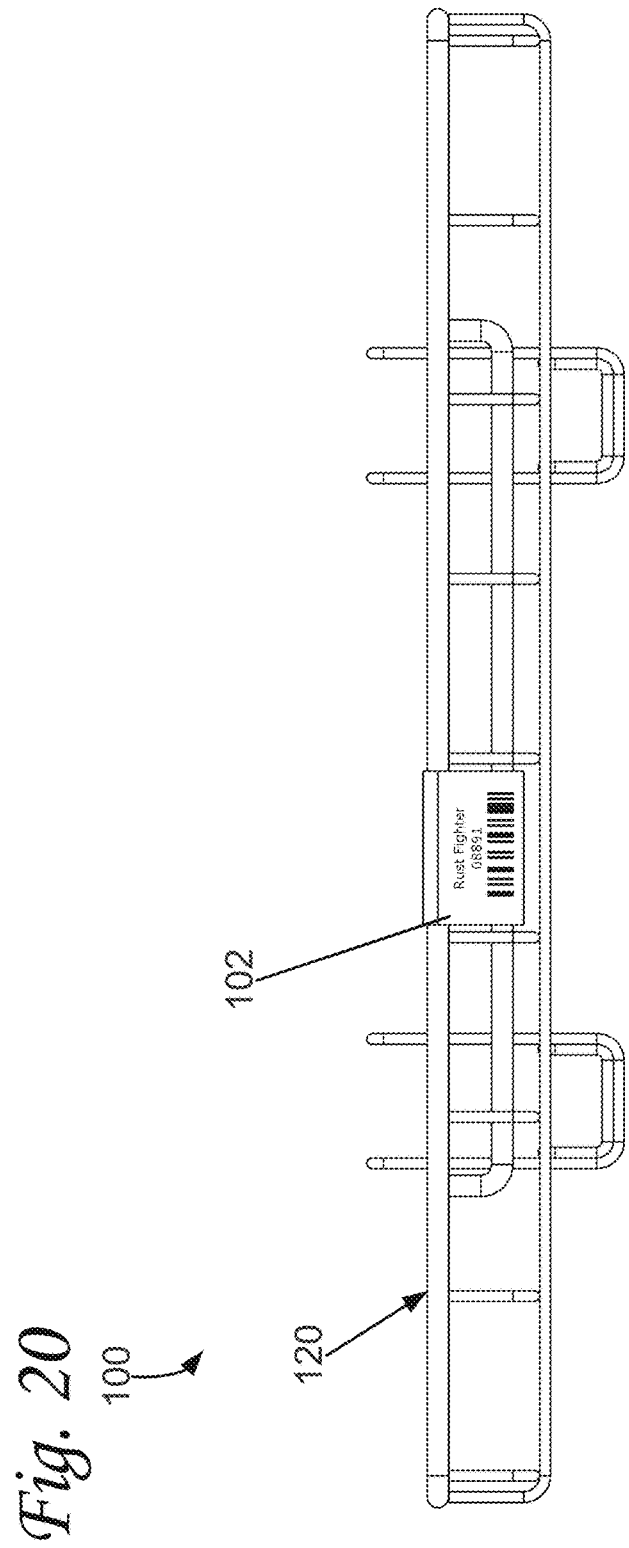
FIG. 20 is front view of the basket shelf of FIG. 11 including identification apparatus.

In at least one embodiment, each material holding apparatus 100 includes identification apparatus 102 configurable to identify the material to be held by the respective material holding apparatus 100 (represented diagrammatically in FIG. 17 and shown in FIGS. 18-20). For example, the identification apparatus 102 may include a sleeve for holding a bar code identifying the material held by the material holding apparatus 100 (e.g., as shown in FIG. 20). In use, if the material held by a particular material holding apparatus 100 has been depleted, a user may scan the bar code of the identification apparatus 102 into an inventory system (e.g., a computer system) to keep track of the inventory of such material. Further, for example, the identification apparatus 102 may include radio-frequency identification (RFD) apparatus to identify the material located in each material holding apparatus 100.

Figure 13:
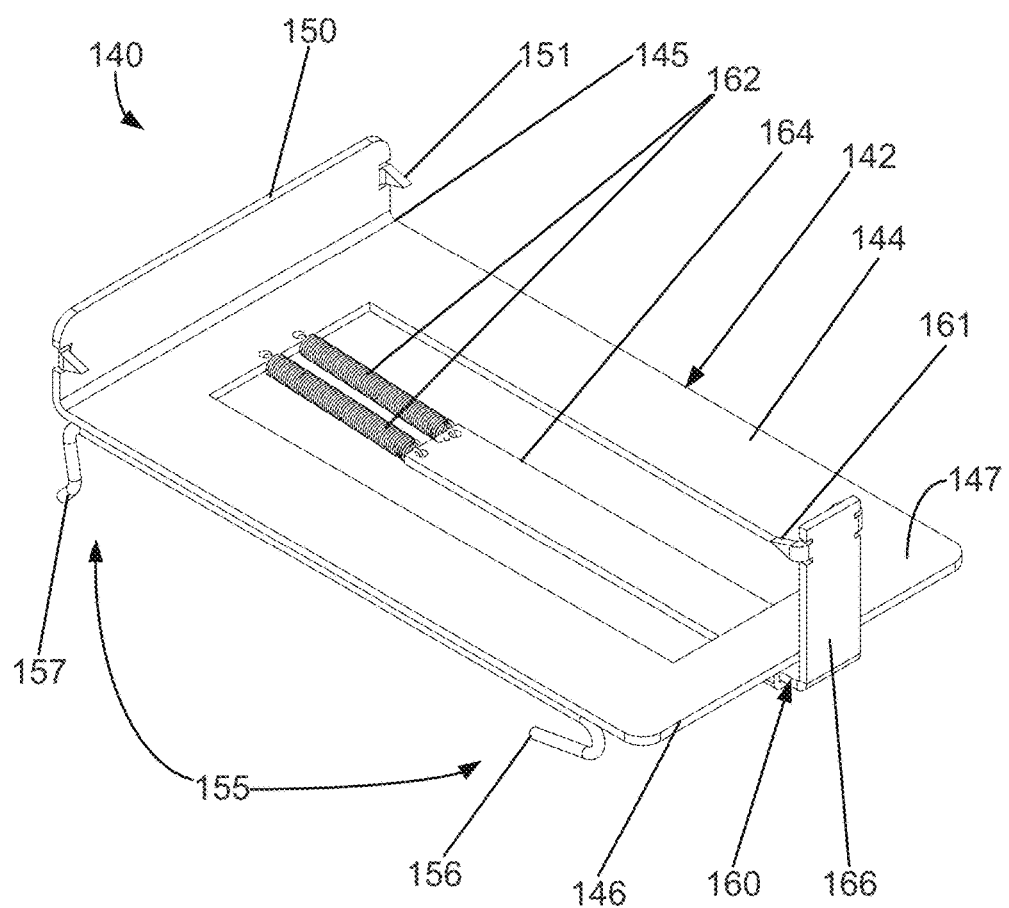
FIG. 13 is a perspective view of an exemplary box holder, which is also shown attached to the stand of FIG. 2 in FIG. 9.

An exemplary system 5 is depicted in FIG. 9 and includes two pieces of material holding apparatus 100, namely a disc holder 180 (described more specifically herein with reference to FIG. 15) and a box holder 140 (described more specifically herein with reference to FIG. 13).

Figure 14:
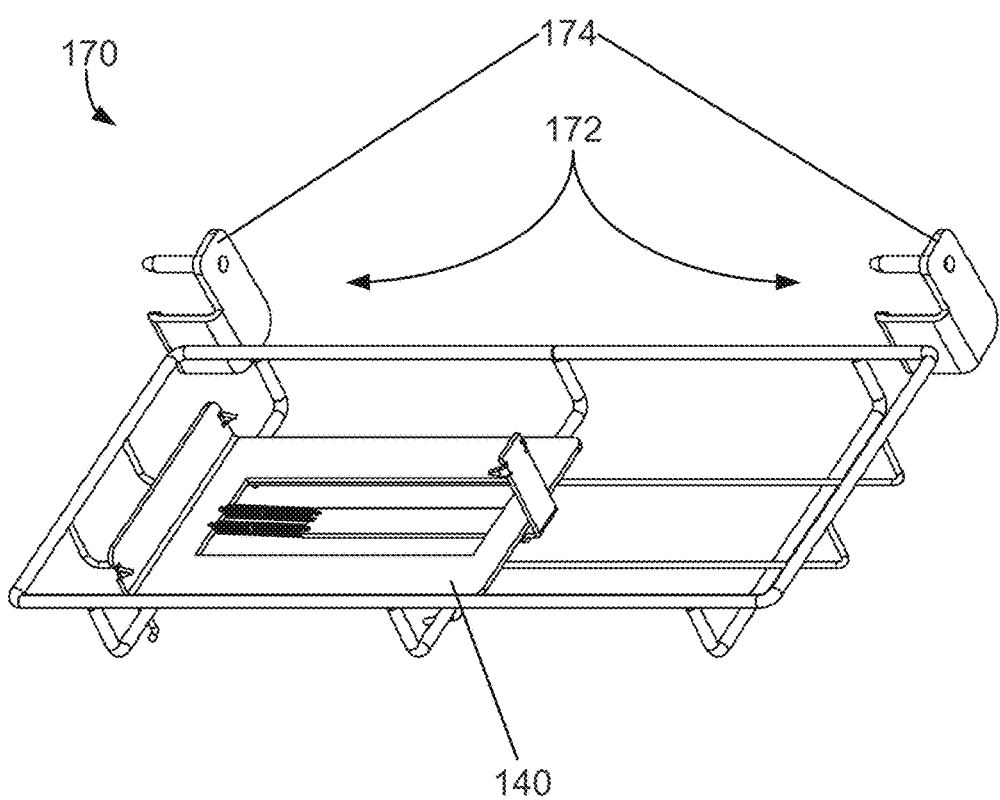
FIG. 14 is a perspective view of the box holder of FIG. 13 attached to an exemplary basket shelf, which is also shown attached to the stand of FIG. 2 in FIG. 10.

Another exemplary system 5 is depicted in FIG. 10 and also includes two pieces of material holding apparatus 100, namely a masker 200 (described more specifically herein with reference to FIG. 16) and a basket shelf 120 with a box holder 140 (described more specifically herein with reference to FIGS. 11 and 14).

Figure 21:
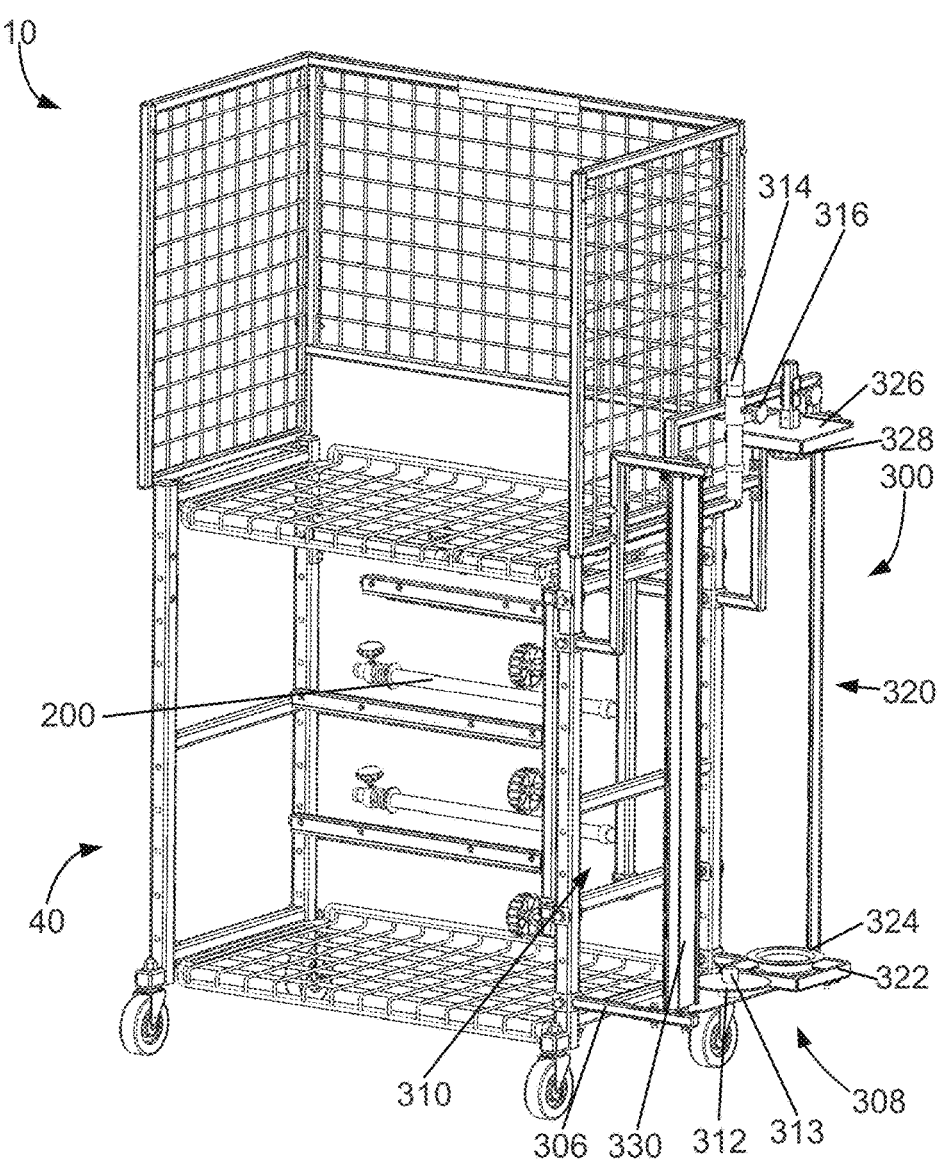
FIG. 21 is a perspective view of the stand of FIG. 2 with an exemplary side-mounted material holding apparatus.
Figure 22:
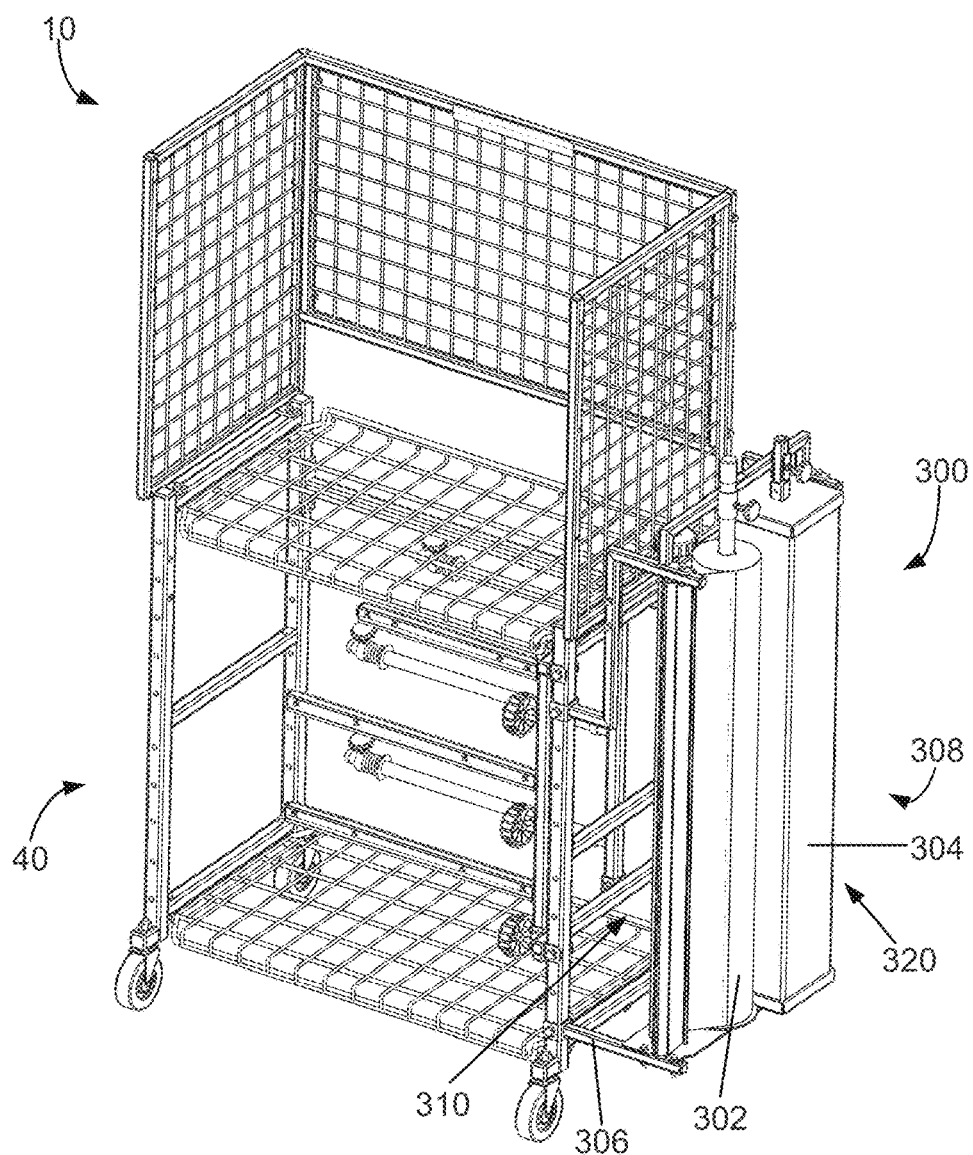
FIG. 22 is a perspective view of the stand of FIG. 21 with the exemplary side-mounted material holding apparatus shown holding material.
Figure 23:
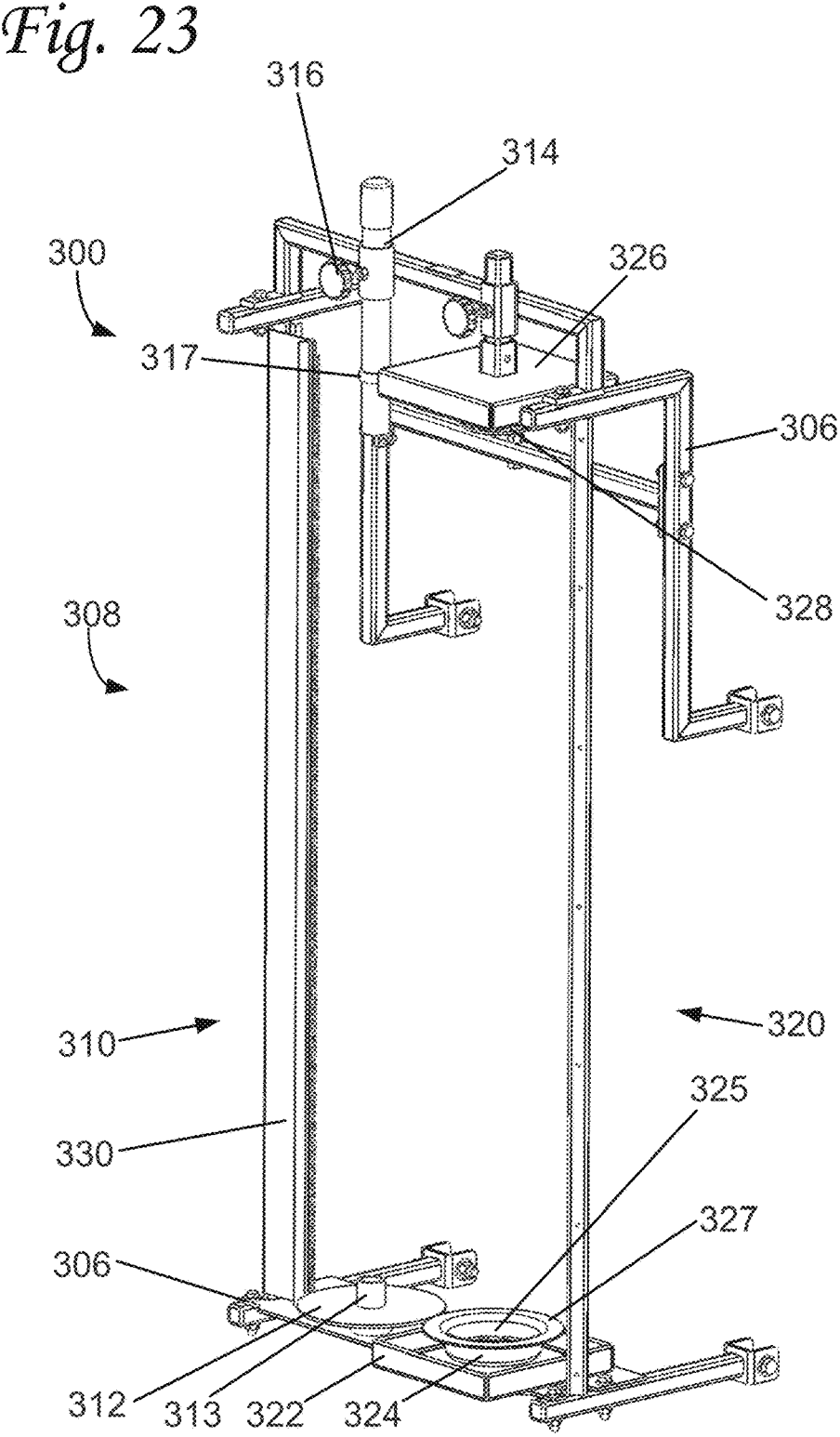
FIG. 23 is a perspective view of the exemplary side-mounted material holding apparatus, which is also shown attached to the stand of FIG. 2 in FIGS. 21-22.
Figure 24:
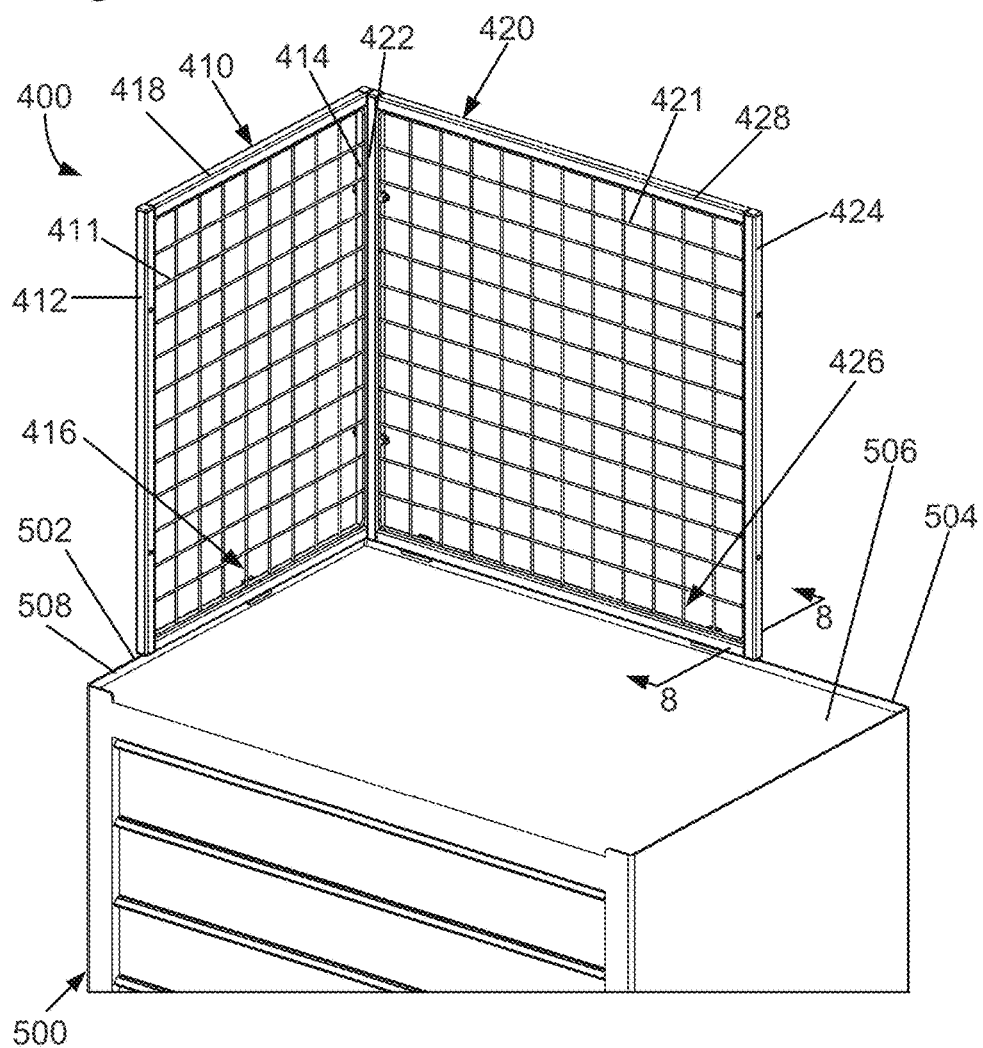
FIG. 24 is a front perspective view of an exemplary wire-grid apparatus coupled to a tool holding apparatus.

Another exemplary system 5 is depicted in FIG. 21 and also includes two pieces of material holding apparatus 100, namely a masker 200 (described more specifically herein with reference to FIG. 16) and a side-mounted material holder 300 (described more specifically herein with reference to FIGS. 21-23).

A basket shelf 120, which is one exemplary material holding apparatus 100, is attached to the wire-grid wall 26 of the stand 10 in FIG. 11. The basket shelf 120 includes a basket 122 formed of wire 125 and attachment apparatus 126. One or more portions of the basket 122 may he similar to the wire-grid walls 22, 24, 26 described herein such that other material holding apparatus 100 may be attached therein.

In at least one embodiment, the basket 122 includes a frame 123 formed of thicker wire to, e.g., add structural support to the basket 122. Further, the basket 122 may form an open area 124 for holding material. For example, a box of protective masks, a box of rubber gloves, etc. may be located in the open area 124.

Attachment apparatus 126 is coupled to the basket 122 and includes at least two U-shaped members 128. As shown, the attachment apparatus 126 includes eight U-shaped members 128, Each of the U-shaped members 128 are configured for attachment to a horizontal wire of the grid of wire 32 of one of the first, second, and third wire-grid walls 22, 24, 26 to support the basket 122 extending from the grid of wire 32. The U-shaped members 128 may be specifically spaced such that two different horizontal wires of the grid of wire 32 of the wire-grid walls 22, 24, 26 (e.g., the two different horizontal wires may be from the second set of wire 38, which are horizontally oriented) are engaged to, e.g., form a stable connection between the attachment apparatus 126 and the wire-grid walls 22, 24, 26. As shown, four of the U-shaped members 128 are attached to a first horizontal wire of the grid of wire 32 of the wire-grid wall 26 and the other four U-shaped members 128 are attached to a second horizontal wire of the grid of wire 32 of the wire-grid wall 36.

The U-shaped members 128 may be formed of wire the same or different wire than used to form the wire-grid walls 22, 24, 26 or basket 122 and may extend from the basket 122 upwardly before bending downwardly approximately 180 degrees (or less than 180 degrees, e.g., 170 degrees, 160 degrees, etc.) to form a U-shaped hook configured to engage a horizontal wire of the grid of wire 32 of the wire-grid wall 36 (e.g., the second set of wire 38). For example, the space formed within or defined by the U-shape of the U-shaped member 128 may be substantially the same size as the diameter of the wire used to form the wire-grid walls 22, 24, 26 such that e.g., the U-shaped member 128 may engage or pinch the wire from either side of the wire to create a stable connection between the U-shape member 128 and the horizontal wire of the grid of wire 32 of the respective wire-grid wall 22, 24, 26.

In use, for example, a user may attach a basket shelf 120 to a wire-grid wall 22, 24, 26 by locating the U-shaped members 128 through the openings 39 formed by the grid of wire 32 and moving the basket shelf generally downwardly (e.g., toward the ground surface 12) to engage the U-shaped members 128 with the grid of wire 32. To remove the basket shelf 120, a user may move the basket shelf 120 generally upwardly to disengage the U-shaped members 128 from the grid of wire 32.

The basket shelf 120 is further depicted in FIG. 20 as including identification apparatus 102. The identification apparatus 102 displays a name, "Rust Fighter," a number (e.g., an inventory number, stock-keeping unit (SKU), etc.), and a bar code (e.g., associated with name and number). In at least one embodiment, the identification apparatus 102 may include a piece of paper upon which the name, number, and bar code are printed and a translucent plastic holding apparatus, or clip, for holding and displaying the piece of paper on the material holding apparatus 100, e.g., the basket shelf 120.

Figure 12A:
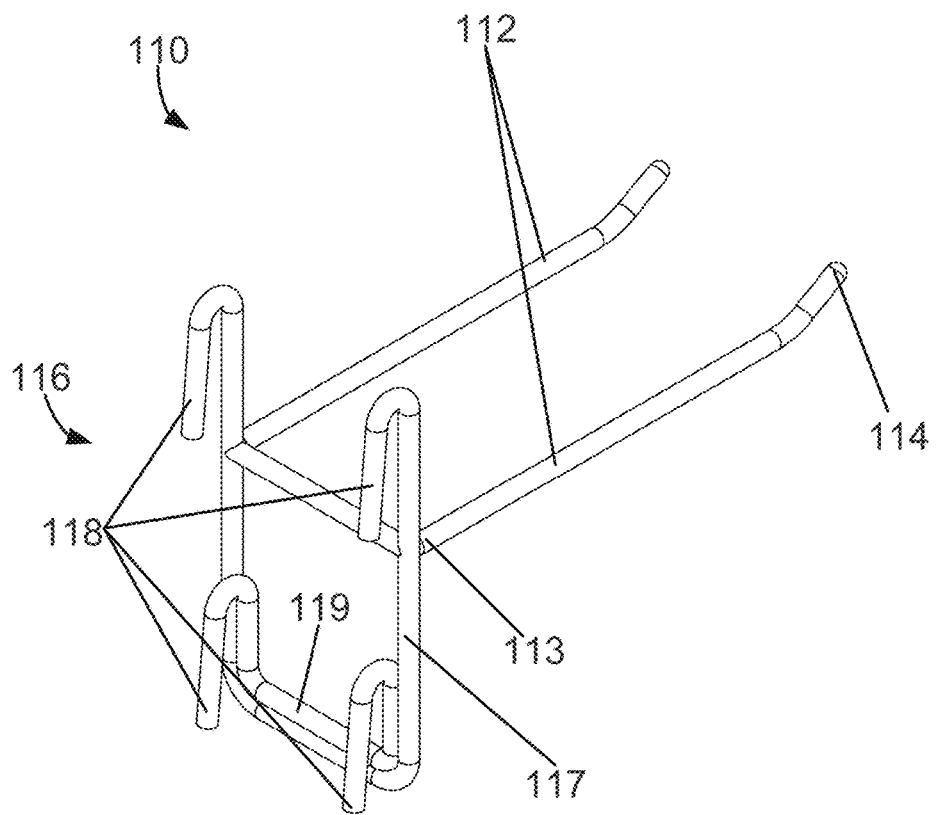
FIG. 12A is perspective view of an exemplary hook attachable to a wire-grid wall of the stand of FIG. 2.
Figure 12B:
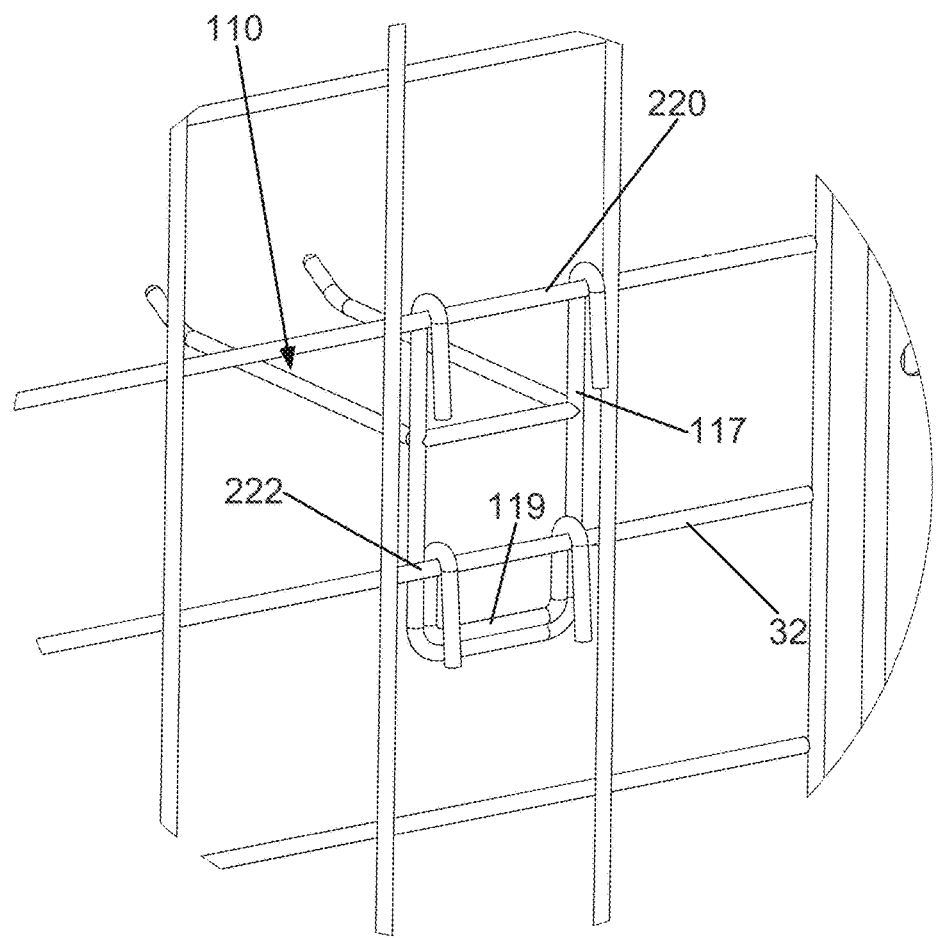
FIG. 12B is perspective view of the hook of FIG. 12A attached to a wire-grid wall of the stand of FIG. 2.

A hook 110, which is also an exemplary material holding apparatus 100, is depicted in FIGS. 12A and 12B. The hook 110 includes at least One elongate member 112 (e.g., formed of wire similar to grid of wire 32 described herein and attachment apparatus 116. As shown, the hook 110 includes two elongate members 112, e.g., such that material may be held between and/or on such elongate members 112. Each elongate member 112 extends from a proximal end 113 to a distal end 114 and includes a slight-upward bend located at the distal end 114.

Attachment apparatus 116 is coupled to the distal end 114 of the elongate members 112. Similar to the attachment apparatus 126 of the basket shelf 120, the attachment apparatus 116 includes at least two U-shape members 118. As shown the attachment apparatus 116 of the hook 110 includes four U-shaped members 118 configured for attachment to two different horizontal wires of the grid of wire 32 (e.g., wires 220, 222) of one of the first, second, and third wire-grid walls 22, 24, 26 of the stand 10. When the attachment apparatus 116 is attached to a wire-grid wall 22, 24, 26 as shown in FIG. 12B, the elongate members 112 may be supported so as to extend outwardly from wire-grid wall 22, 24, 26 to, e.g., be configured to hold material. The installation and removal of the hook 110 from the wire-grid walls 22, 24, 26 of the stand 10 is substantially similar to the installation and removal methods described herein within reference to the basket shelf 120.

The attachment apparatus 116 of the hook 110 (or any other material holding apparatus 100) may be formed of two more wires coupled together. For example, as shown, the attachment apparatus 116 is formed of a first wire 117 and a second wire 119, The first wire 117 forms at least the two upper U-shaped members 118 and the second wire 119 forms at least the two tower U-shaped members 118. Further, the U-shaped members 118 may be described as being offset but parallel, For example, the U-shaped members 118 formed by the first wire 117 may not lie in the same plane as either of the U-shaped members 118 of the second wire 119. Instead, as shown, the U-shaped members 118 of the second wire 119 are located offset to the inside of each of the U-shaped members 118 of the first wire 117. In other words, the U-shaped members 118 may be not be aligned vertically instead, the U-shaped members 118 attachable to a first horizontal wire 220 may be slightly offset from the U-shaped members 118 attachable to a second horizontal wire 222.

Figure 12C:
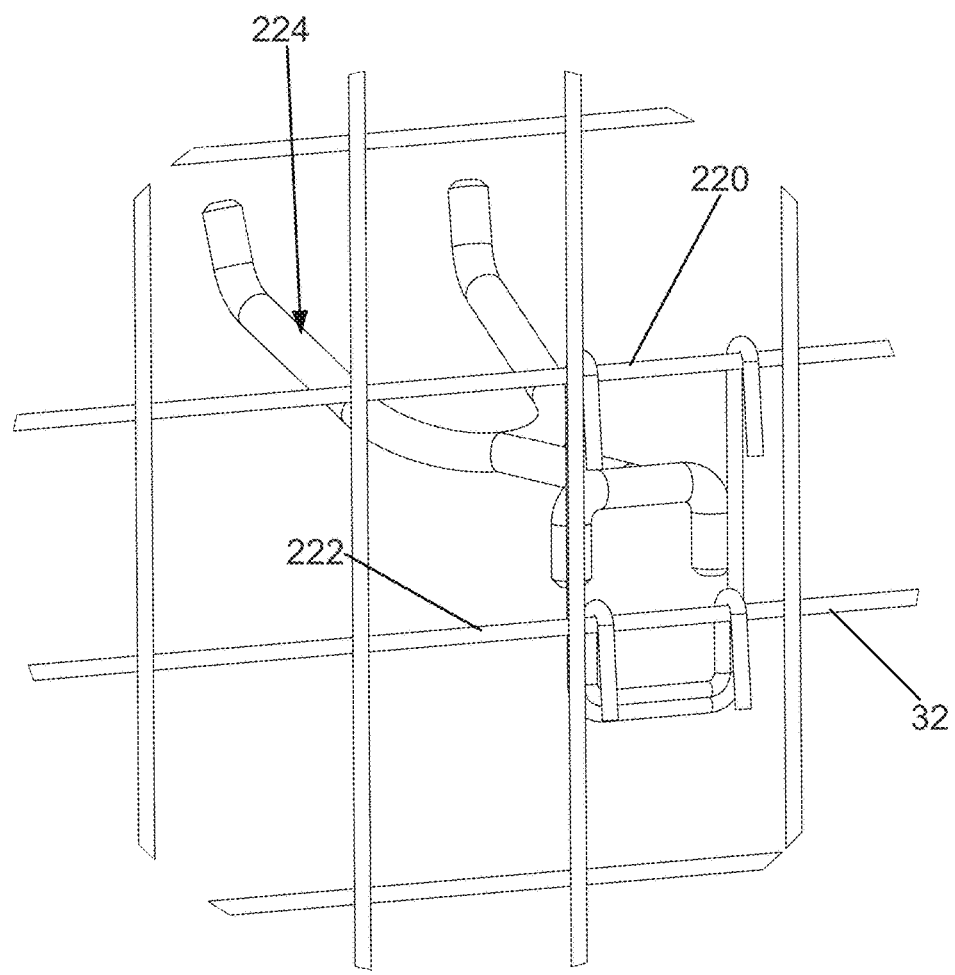
FIG. 12C is perspective view of another exemplary hook attached to a wire-grid wall of the stand of FIG. 2.

A hook 224, which is another exemplary material holding apparatus 100, is depicted in FIG. 12C. The hook 224 is attached to a grid of wire 32 (e.g., attached to two different horizontal wires 220, 220 of the grid of wire 32) and may be similar to the hook 110 described herein with reference to FIGS. 12A and 12B. The hook 224, however, may be formed of heavy-gauge wire (e.g., wire having a thicker diameter, etc.) such that the hook 224 may support larger and/or heavier apparatus or material. Further, the elongate members of the hook 224 may extend more upwardly or vertically than the elongate members 112 of the hook 110.

A box holder 140, which is another exemplary material holding apparatus 100, is depicted in FIG. 13. The box holder 140 includes a body 142, a retention member 160, and attachment apparatus 155.

The body 142 includes a planar base 144 and a stop member 150. The planar base 144 extends from a first end 145 to a second end 146 and defines a first surface 147 and a second surface opposite the first surface 147. The stop member 150 is located proximate the first end 145 of the planar base 144 (e.g., the stop member 150 may extend from the first surface 147 of the planar base 144). In at least one embodiment, the stop member 150 and the planar base 144 are perpendicular to each other. The stop member 150 may include engagement apparatus (e.g., at least two barbs 151 extending outwardly therefrom in a direction generally parallel to the planar base 144) to engage material, e.g., a cardboard box of material, to more securely hold the material.

The retention member 160 is movably coupled to the body 142 (e.g., the planar base 144) and is biased by a biasing mechanism in a direction towards the stop member 150 and first end 145 to retain material (e.g., a cardboard box of material) located between at least a portion of the retention member 160 and at least a portion of the stop member 150. As shown the retention member 160 includes an elongated portion 164 and an engagement portion 166 coupled to the elongated portion 164. The elongated portion 164 may be arranged parallel to the planar base 144 of the body 142 and the engagement portion 166 may be arranged perpendicular to the planar base 144 of the body 142. As shown, the retention member 160 is biased using a pair of springs 162 attached to the elongated portion 164 but may be biased in any manner, e.g., using various resilient materials, etc. The engagement portion 166 of the retention member 160 may further include engagement apparatus (e.g., at least two barbs 161) that extend outwardly therefrom (in a direction generally parallel to the planar base 144) to engage material, e.g., a cardboard box of material, to more securely hold the material.

Although each of the stop member 150 and the engagement portion 166 include two barbs, the stop member 150 and the engagement portion 166 may include no barbs or one or more barbs (e.g., no barbs, one barb, four barbs, etc.), or any other engagement apparatus configured to hold material of various shapes and/or sizes.

In use, a user may grasp and pull the retention member 160 away from the second end 146 of the body 142 (e.g., in the opposite direction the retention member 160 is biased), locate the material (e.g., a cardboard box of material) between the stop member 150 and the engagement portion 166 of the retention member 160, and release the retention member 160 such that material is pinched or grasped between the stop member 150 and the engagement portion 166 of the retention member 160. The barbs 151, 161 of the stop member 150 and the engagement portion 166 may penetrate the material or box of material to, e.g., more securely grasp the material or box of material.

The attachment apparatus 155 may be attached to the second surface of the planar base 144 (opposite the first surface 147) and may be similar to the attachment apparatus 116, 126 described herein. For example, the attachment. apparatus 155 may include at least two U-shaped members 156 configured for attachment to the grid of wire 32, 58 of the wire-grid walls 22, 24, 26 and the shelves 56. Further, the attachment apparatus 155 additionally may include two bent members 157 that do not bend as far (e.g., less than approximately 180 degrees) as the U-shaped members 156 but are also for engaging the grid of wire 32, 58. Such bent members 157 may allow for quicker installation and removal of the box holder 140 from a shelf 56.

A basket shelf 170, which is another exemplary material holding apparatus 100, is holding a box holder 140 in FIG. 14. The basket shelf 170 is substantially similar to the basket shelf 120 described herein with reference to FIG. 11 except for its attachment apparatus 172.

The attachment apparatus 172 of the basket shelf 170 includes a pair of locking brackets 174, e.g., instead of U-shaped members, for engaging the plurality of holes 53 of the lower support members 42, 44, 46, 48 described herein. Each locking bracket 174 may include at least one inner surface configured to wrap around at least a portion of a tower support member when the basket shelf 170 is attached to the lower support member. Each locking bracket 174 further includes a pin extending from the at least one inner surface of the locking bracket 174. The pin is sized as a function of the holes 53 of the lower support members 42, 44, 46, 48 such that it extends through a first side surface and a second side surface of the lower support members 42, 44, 46, 48 when the basket shelf 170 is attached to the lower support member 42, 44, 46, 48, Further description of such locking brackets 174 may be found in U.S. Pat. No. 7,314,143 entitled "Adjustable Shelving System" issued to Bryan Johnson on 1 Jan. 2008, which is incorporated into this application by reference in its entirety.

Figure 15:
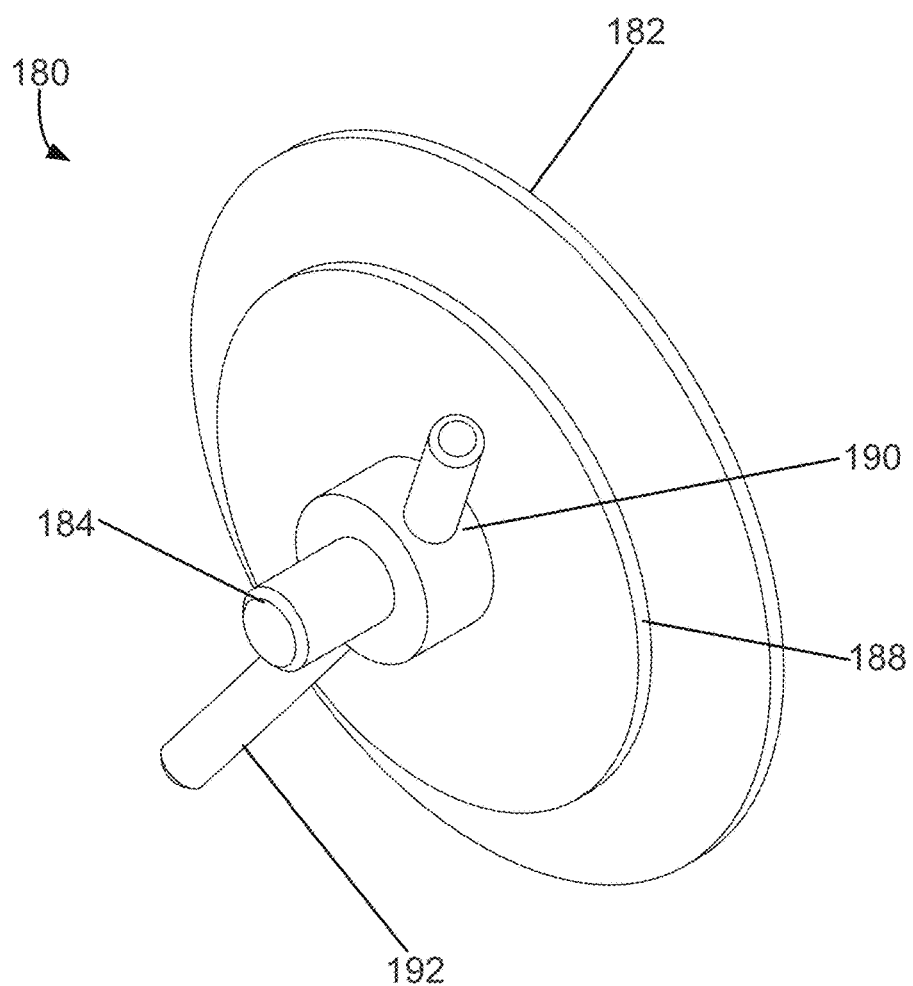
FIG. 15 is a perspective view of an exemplary disc holder, which is also shown attached to the stand of FIG. 2 in FIG. 9.

A disc holder 180, which is another exemplary material holding apparatus 100, is depicted in FIG. 15. The disc holder 180 is configured to hold abrasive discs (e.g., sanding discs for use with pneumatic angle grinders) such that the abrasive discs do not warp from a substantially planar condition (e.g., to apply pressure to the abrasive discs to maintain the flatness of the abrasive discs), The disc holder 180 includes a first plate 182, an elongate member 184, attachment apparatus (not shown in FIG. 15), and a second plate 188.

The first plate 182 defines a front side and a rear side, and the elongate member 184 extends perpendicular to the first plate 182 (e.g., extends from and is perpendicular to the front side of the first plate 182). The attachment apparatus of the disc holder 180, although not shown, may be substantially similar to the attachment apparatus 116, 126 described herein with reference to FIGS. 11-12 and is located on the rear side of the first plate 182 and configured for attachment of the disc holder 180 to one of the first, second, and third wire-grid walls 22, 24, 26 of the stand 10. For example, a disc holder 180 is shown attached to the first wire-grid wall 22 of the stand 10 in FIG. 9.

The second plate 188 defines a front side and rear side, and further defines an opening configured to receive the elongate member 184. As described, for example, the disc holder 180 is configured to hold one or more circular abrasive discs. More specifically, the disc holder 180 is configured to receive at least one abrasive disc between the front side of the first plate 182 and the rear side of the second plate 188 with the elongate member 184 extending through an opening defined by the at least one abrasive disc. In other words, the abrasive disc would be "sandwiched" between the first plate 182 and the second plate 188 with the elongate member 184 extending through a central opening in the abrasive disc. For example, the plates 182, 188 may be configured to apply pressure to an abrasive disc to maintain the flatness of the abrasive disc.

The disc holder 180 may further include a fastener 190 configured to receive the elongate member 184 and to hold the second plate 188 against an abrasive disc, which, in turn is held against the first plate 182. At least in one embodiment, the elongate member 184 is threaded and the fastener 190 threads onto the elongate member 184 to provide the retention functionality of the fastener 190. As shown, the fastener 190 includes wings 192 such that, e.g., a user may grasp the wings 192 and apply rotational force to the fastener 190 so as to rotate the fastener with respect to the elongate member 184 (e.g., such that the fastener 190 may be tightened or loosened when the elongate member 184 is threaded). In at least one embodiment, the fastener 190 may be sized with respect to the elongate member 184 to provide an interference fit between the fastener 190 and the elongate member 184 (e.g., as opposed to using a thread connection) to retain the second plate 188 against an abrasive disc and/or the first plate 182.

Figure 16:
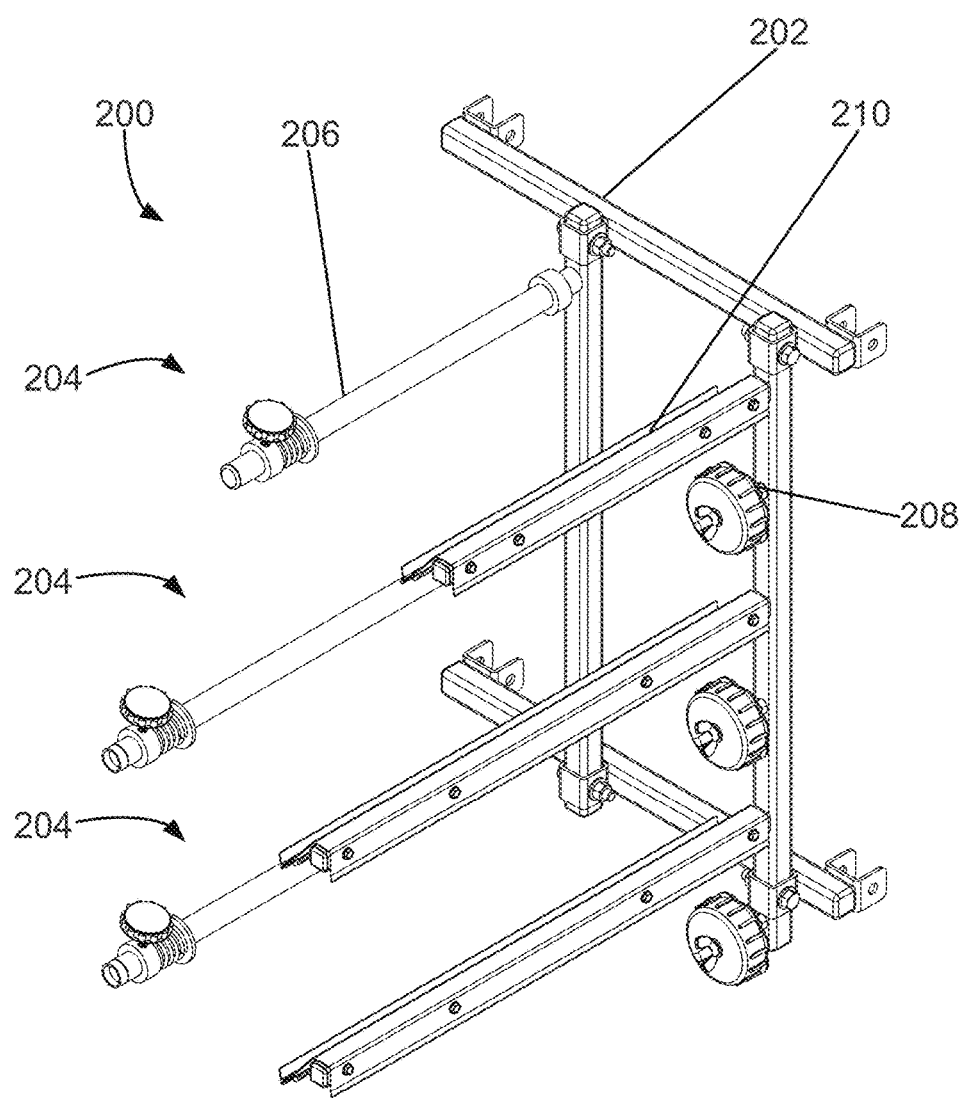
FIG. 16 is a perspective view of an exemplary masker, which is also shown attached to the stand of FIG. 2 in FIG. 10.

A masker 200, which is another exemplary material holding apparatus 100, is depicted in FIG. 16. The masker 200 is configured for holding three sets of paint masking material. The masker 200 includes a frame 202 and three masking material holding apparatus 204 coupled to the frame 202. The frame 202 may be coupled to the lower support members 42, 44, 46, 48 of the lower portion 40 of the stand 10, e.g., as shown in FIG. 10 (e.g., bolting the frame 202 to the lower support members 42, 44, 46, 48 using the openings 53).

Each masking material holding apparatus 204 includes a first axle member 206, a second axle member 208, and a tear member 210, each extending from the frame 202. The first axle member 206 is configured to be positioned within the center opening of a roll of masking paper (e.g., masking paper to be used in automotive painting) and the second axle member 208 is configured to be positioned within the center opening of a roll of masking tape (e.g., masking tape also to be used in automotive painting). Each axle member 206, 208 may include a retention apparatus to hold the roll of paper or tape on the respective axle member 206, 208.

The tear member 210 is configured such that masking paper and masking tape may be torn from the rolls of masking paper and masking tape when pulled across the tear member 210.

A side-mountable material holder 300, which is another exemplary material holding apparatus 100, is depicted in FIGS. 21-23. The side-mountable material holder 300 may be configured to hold one or more rolls of material (e.g., masking material, etc.). For example, as shown in FIG. 22, a roll of material 302 (e.g., paper masking material, etc.) and a box of material 304 (e.g., a box containing a. roll of plastic masking material, etc.) are held by the side-mountable material holder 300.

The exemplary side-mountable material holder 300 may include a frame 306 and material holding apparatus 308 coupled to the frame 306 (e.g., welded, bolted, glued, etc.). The frame 306 may be coupled to the stand 10. As shown, the frame 306 is bolted to the lower support members 42, 44 using the openings 53. However, the frame 306 may be removably or fixedly coupled to the stand 10 by any method (e.g., welding) as would be known by one having skill in the art.

The material holding apparatus 308 may be configured to hold at least one roll of material vertically. As shown, the material holding apparatus 308 includes a roll holder 310 configured to hold a roll of material 302 and box holder 320 configured to hold a box of material 304.

As described, the material holding apparatus 308 (e.g., the roll holder 310, the box holder 320, etc.) is configured to hold one or more rolls of material "vertically." In other words, the material holding apparatus 308 is configured to hold a roll of material such that an axis upon which the roll is rotatable (e.g., an axis extending through the middle of the roll along the length of the roll of material) is perpendicular to a ground surface 12 upon which the stand 10 is located. Further, although the material holding apparatus 308 described herein has been configured to hold one or more rolls of material "vertically," it is to be contemplated that the material holding apparatus 308 may be configured to hold one or more rolls of material in additional, non-vertical positions (e.g., horizontal, at 45 degrees, etc.).

The exemplary roll holder 310 may include a lower support disc 312 configured to support a roll of material vertically thereon and a lower spindle portion 313 to extend into a center opening of a roll of material 302 (e.g., masking paper to be used in automotive painting). The roll of material 302 may include a cylindrical tube defining an opening therethrough around which material may be wrapped. The lower support disc 312 may support the material on the roll from sliding off the roll downwardly (e.g., off the cylindrical tube towards aground surface) and the lower spindle portion 313 may center the roll of material 302 on the lower support disc 312 the lower spindle portion 313 may be located inside of the opening of the cylindrical tube of the roll of material 302).

The roll holder 310 may further include an upper spindle portion 314 that is configured to extend into the inside of a center opening of the roll of material 302. For example, the upper spindle portion 314 may extend along the axis of the roll of material 302 (e.g., upon which the roll of material 302 may rotate). Each of the lower support disc 312 and the upper spindle portion 314 may be rotationally coupled to the frame 306, e.g., such that they may rotate with the roll of material 302.

Further, the roll holder 310 may include retention apparatus 316 configured to selectively retain (e.g., restrict, lock and unlock, etc.) the upper spindle portion 314 from vertical movement (e.g., movement upwardly and downwardly, towards or away from a ground surface, etc.) along an axis of the roll of material 302 (e.g., perpendicular to the ground surface). The retention apparatus 316 may be used to install, or place, a roll of material within the roll holder 310. For example, a user may release the upper spindle portion 314 using the retention apparatus 316 and move the upper spindle portion 314 upwardly. After the upper spindle portion 314 is located in an upward position, a roll of material 302 may be placed on the lower support disc 312 and the upper spindle portion 314 may be moved downwardly into the inside of the hollow tube around which the material of the roll of material 302 is wrapped. The retention apparatus 316 may then be used to retain the upper spindle portion 314 in this lowered position at least partially within the hollow tube of the roll of material 302).

In other words, the upper spindle portion 314 may be configured in a raised configuration in which a roll of material 302 may be removed or installed within the roll holder 310 and may also be configured in a lowered configuration in which a roll of material 302 may be retained, or held, by the roll holder 310. In at least the embodiment shown, the upper spindle portion 314 may further include a lower flange 317 that may restrict the downward movement (e.g., towards the ground surface) of the upper spindle portion 314 from moving too far downwardly) into the opening of the cylindrical tube of the roll of material 302.

The box holder 320 may include a lower box support portion 322 and a lower support disc 324. The lower box support portion 322 may be configured to support the bottom end of a box of material 304 (e.g., as shown in FIG. 22). The lower support disc 324 may be rotationally coupled to the lower box support portion 322 and may be configured to support the bottom end of a roll of material located in the box of material 304. For example, the bottom side of the box of material 304 may be removed such that the lower end of the roll of material within the box of material 304 may be rested on the lower support disc 324 (e.g., for rotational movement) and the bottom portion of the box of material 304 may be held, or supported, (e.g., supported on all four sides, restricted from horizontal movement, etc.) by the lower box support portion 322 when a box of material 304 is held thereby. More specifically, the roll of material within the box of material 304 may be wrapped around a cylindrical tube. The cylindrical tube may rest within the center portion 325 of the lower support disc 324 while the material wrapped around the material may rest on the flange portion 327.

The box holder 320 may further include an upper box support portion 326 and an upper support disc 328 rotationally coupled to the upper box support portion 326. Similar to the lower box support portion 322, the upper box support portion 326 may be configured to hold, or support, a top portion of the box of material 304 when a box of material 304 is held thereby (e.g., where the top side of the box of material 304 is removed such that the upper end of the roll of material within the box of material 304 may contact the upper support disc 328). The upper box support portion 326 may be adjustably coupled to the frame 306 for vertical movement, e.g., similar to the upper spindle portion 314 of the roll holder 310 (e.g., for installation and removal of a box of material 304). Further, when a box of material 304 is held by the box holder 320, the upper support disc 328 may be configured to be extended into the inside of a cylindrical tube around which the material of the roll of material (i.e., within the box of material 304) is wrapped.

The side-mountable material holder 300 may further include one or more tear members 330 configured such that material held by the material holding apparatus 308 (e.g., masking material, etc.) may be torn from the rolls of material when pulled across the tear member 330.

The wire-grid walls described herein with reference to the exemplary stand 10 as well as the plurality of exemplary material holding apparatus 100 configured to be used in conjunction with the wire-grid walls is contemplated to be used with additional apparatus. For example, a wire-grid apparatus 400, which includes wire-grid walls, couplable (e.g., removably couplable) to a tool holding apparatus 500 is described herein with reference to FIGS. 24-28 and may be used in conjunction with one or more material holding apparatus 100 (e.g., which may be described as a system) for holding material over a ground surface. More specifically, one or more material holding apparatus 100 may be attachable (e.g., removably attachable) to the wire-grid apparatus 400 (e.g., the wire-grid walls) and configured to hold one or more materials (e.g., paint-masking material, polishes, paint guns, paper towels, tubes of adhesive, abrasive discs, grinding discs, rolls of sand paper, etc.).

The tool holding apparatus 500 may be any apparatus configured for holding parts, tools, materials, paint, and/or anything else that may avail itself to storage. In other words, although the tool holding apparatus 500 is called a "tool" holding apparatus, the tool holding apparatus 500 may be configured to hold anything (e.g., including tools).

An exemplary tool holding apparatus 500 may be a MAC TOOLS MACSIMIZER 11-Drawer Workstation, SNAP-ON Roll Cab—Classic 60, SNAP-ON Roll Cab—Classic 96, MATCO TOOLS 1 Bay 22" Standard Rollaway, etc. The tool holding apparatus 500 may include at least two metal sides 502, 504, a surface 506 (e.g., an upper, or top, surface), and a flange 508 extending above the surface 506 about a portion of a perimeter of the surface 506 (e.g., at least a portion of the perimeter adjacent the two metal sides 502, 504).

The exemplary wire-grid apparatus 400 may include a first wire-grid wall 410 and a second wire-grid wall 420. The first wire-grid wall 410 may extend from a first end 412 to a second end 414 and the second wire-grid wall 420 may extend from a first end 422 to a second end 424. Similar to the wire-grid walls 22, 24, 26, the second end 414 of the first wire-grid wall 410 may be coupled to the first end 422 of the second wire-grid wall 42 such that the first wire-grid wall 410 is perpendicular to the second wire-grid wall 420. Further, each of the wire-grid walls 410, 420 may be perpendicular to the surface 506 of the tool holding apparatus 500 and to the ground surface when coupled to a tool holding apparatus 500 (e.g., that is located on a ground surface). In other words, each of the wire-grid walls 410, 420 may be described as being vertically oriented.

Figure 25:
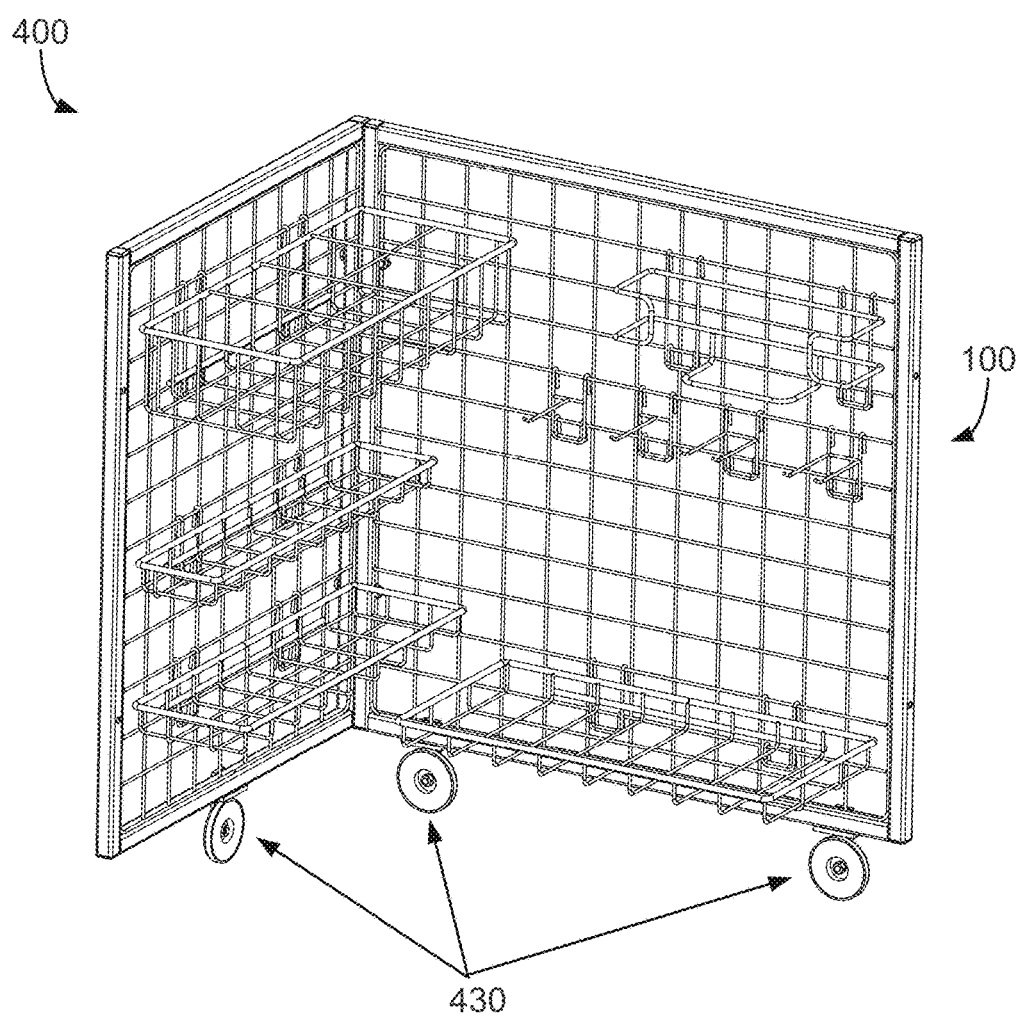
FIG. 25 is the exemplary wire-grid apparatus of FIG. 24 with exemplary material holding apparatus.
Figure 26:
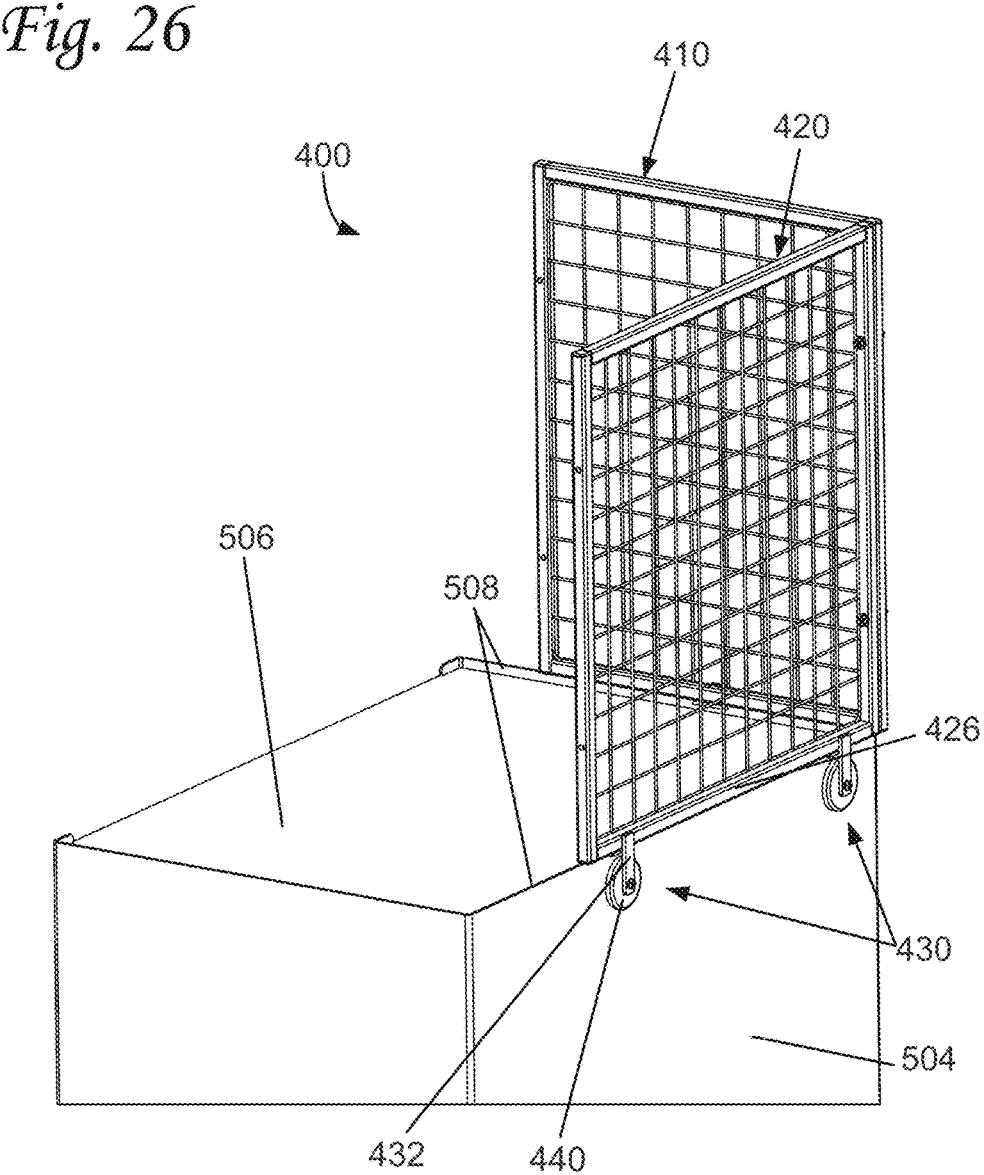
FIG. 26 is a rear perspective view of the exemplary wire-grid apparatus coupled to the tool holding apparatus of FIG. 24.
Figure 28:
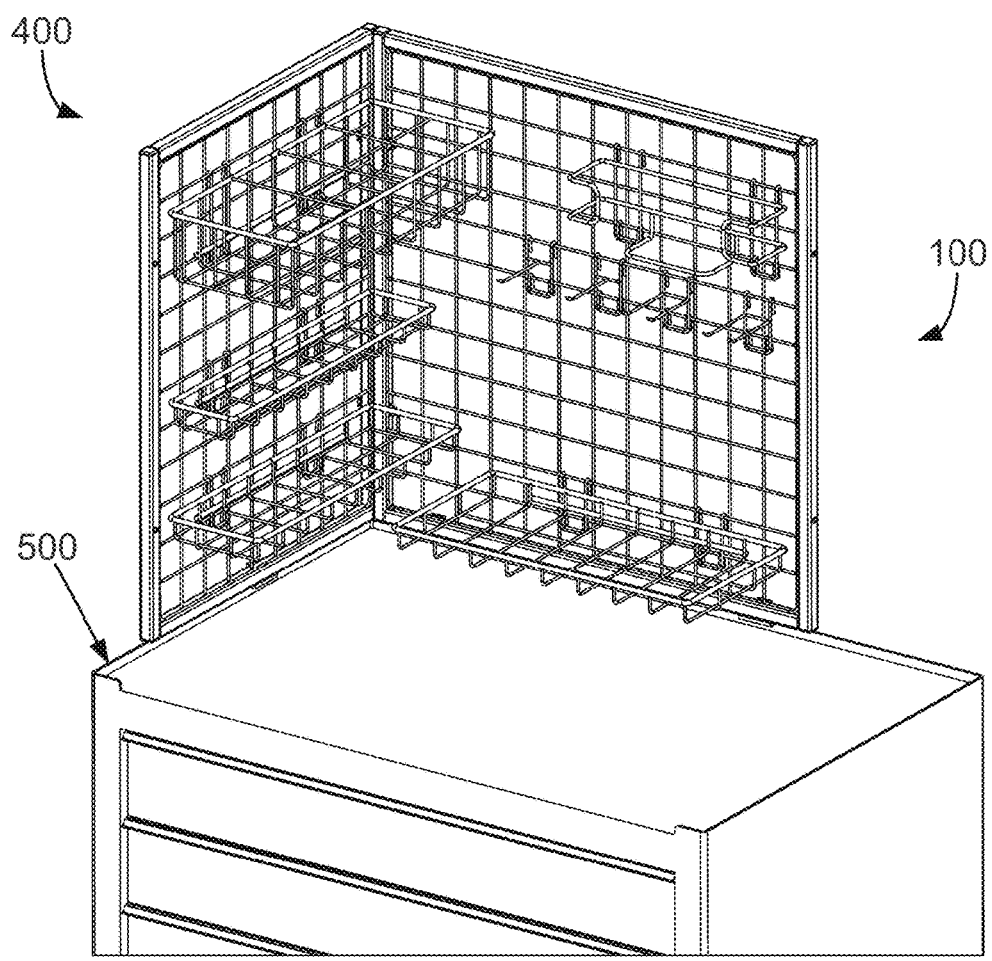
FIG. 28 is a front perspective view of the exemplary wire-grid apparatus coupled to the tool holding apparatus of FIG. 24 with exemplary material holding apparatus.

Similar to the wire-grid walls 22, 24, 26 described herein, each of the first and second wire-grid walls 410, 420 of the wire-grid apparatus 400 may include a grid of wire 411, 421, respectively, lying in a plane configured to receive material holding apparatus on either side of the grid of wire and a frame 418, 428, respectively, extending around a plurality of edges 416, 426, respectively, of the grid of wire. For example, multiple material holding apparatus 100 are shown in FIGS. 25 and 28 attached to the wire-grid walls 410, 420 of the wire-grid apparatus 400.

Further, the structure of the wire grid-walls 410, 420 may similar to the wire-grid walls 22, 24, 26, For instance, each grid of wire 411, 421 may include a first set of wire and a second set of wire. Each wire of the first set of wire may extend parallel to each other, and each wire of the second set of wire may extend parallel to each other and may be perpendicular to each wire of the first set of wire. Further, each wire of the first set of wire may be spaced equidistantly from each adjacent wire and each wire of the second set of wire may be spaced equidistantly from each adjacent wire.

As described, the wire-grid apparatus 400 is couplable to the tool holding apparatus 500. To facilitate this coupling, in at least the embodiment depicted, the wire-grid walls 410, 420 of the wire-grid apparatus 400 may further include at least one retention apparatus 430 (e.g., one or more retention apparatus 430). The retention apparatus 430 are coupled to the frame 418, 428, respectively, along a portion of at least one edge 416, 426, respectively, of the wire-grid wall 410, 420. The retention apparatus 430 are configured to couple the wire-grid wail 410, 420 to the tool holding apparatus 500 (e.g., proximate at least a portion of the flange 508), which is shown coupled thereto in FIGS. 26-27.

Each retention apparatus 430 may be configured to restrict movement of the wire-grid apparatus 400 from the tool holding apparatus 500 when coupled thereto such that the wire-grid apparatus 400 becomes a stable, additional structure for holding tools, material, etc. (e.g., using one or more material holding apparatus 100). More specifically, the retention apparatus 430 may limit, restrict, or impede, movement of the wire-grid apparatus 400 in an upward direction (e.g., away from the surface 506 or the ground surface), in a downward direction (e.g., towards the surface 506 or the ground surface), and in lateral, or horizontal, directions (e.g., parallel to the surface 506 or the ground surface). In other words, the retention apparatus 430 may limit, restrict, or impede, movement of the wire-grid apparatus 400 in ail directions such that the wire-grid apparatus 400 is a stable, non-moving apparatus when coupled to a tool holding apparatus 500 (e.g., to support material and/or material holding apparatus above a ground surface).

Further, the wire-grid apparatus 400 may be described as being "removably" couplable to the tool holding apparatus 500. For example, although the wire-grid apparatus 400 may limit, restrict, or impede, movement of the wire-grid apparatus 400 in an upward direction, the retention apparatus 430 may be configured such that a human user may generate enough force to move the wire-grid apparatus 400 in an upward direction off of the tool holding apparatus 500 to which it is coupled (e.g., to de-couple to the wire-grid apparatus 400 from the tool holding apparatus 500).

In the embodiment depicted, the retention apparatus 430 includes an elongate member 432, magnetic material 440, and one or more flanges 450. The elongate member 432, magnetic material 440, and the one or more flanges 450 are configured to allow the wire-grid apparatus 400 to be coupled to the tool holding apparatus 500.

Figure 27:
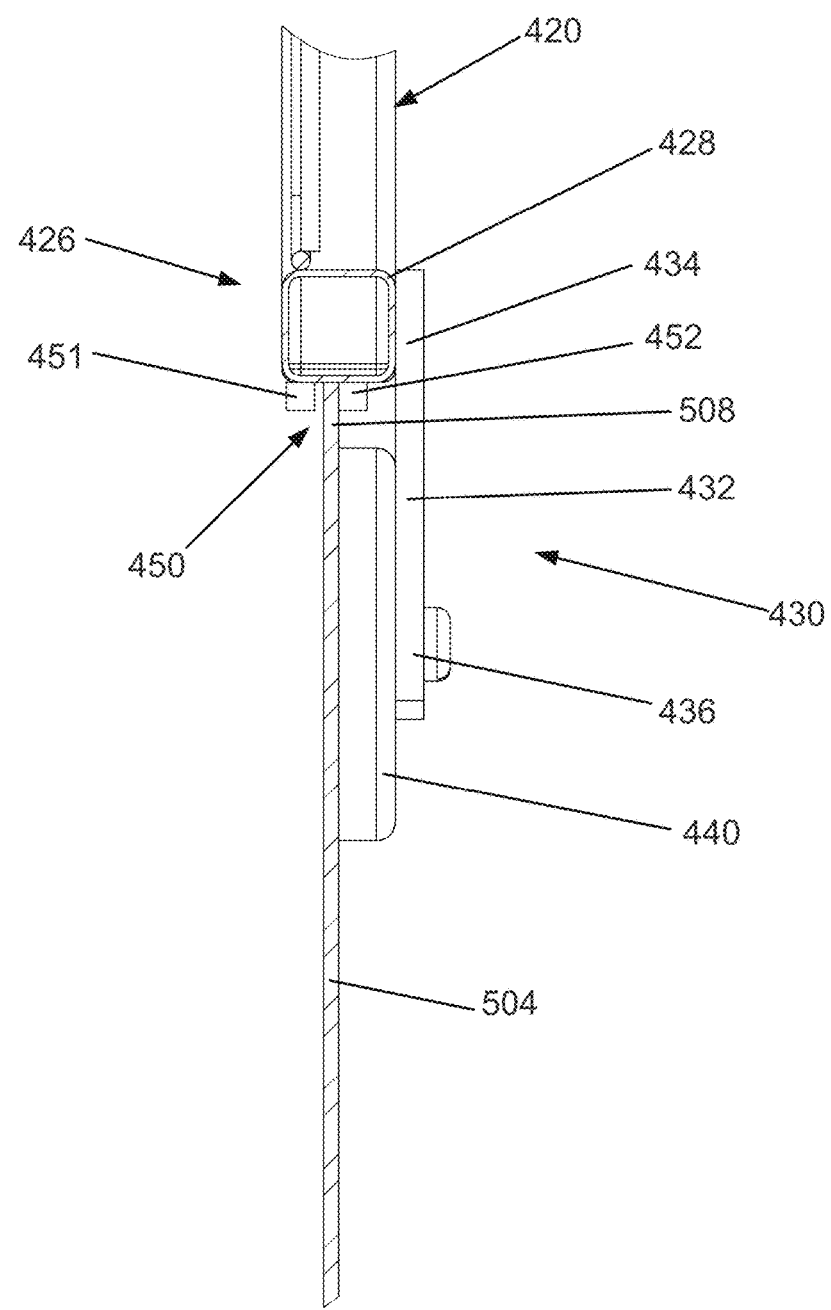
FIG. 27 is a cross-sectional view of the exemplary wire-grid apparatus coupled to the tool holding apparatus taken across line 8-8 in FIG. 24.

A cross-section of an exemplary retention apparatus 430 taken along tine 8-8 is depicted in FIG. 27. As shown, the elongate member 432 may extend from a proximal end 434 to a distal end 436. The proximal end 434 may be coupled to the frame 428 of the wire-grid wall 420. When the wire-grid apparatus 400 the wire-grid walls 410, 420) is coupled to the tool holding apparatus 500, the elongate member 432 may extend below the surface 506 of the tool holding apparatus 500, e.g., about 1 inch inches to about 24 inches (e.g., about 3 inches).

Magnetic material 440, which is configured to couple (e.g., magnetically couple) the wire-grid wall 410, 420 to one of the metal sides of the tool holding apparatus 500 may be coupled to the distal end 436 of the elongate member 432 (e.g., using a fastener such as a bolt as depicted, using adhesive, etc.), As shown in FIG. 27, the magnetic material 440 is coupled (e.g., magnetically coupled) to the metal side 504 of the tool holding apparatus 500. As used herein, magnetic material may be defined as material producing a magnetic field operable to attract ferromagnetic material (e.g., the metal sides of the tool holding apparatus 500). At least in the embodiment depicted, the magnetic material 440, when coupled to the tool holding apparatus 500, is adjacent (e.g., in contact with) the surface of the metal side 504. In other embodiments, the magnetic material 440 may not be adjacent to the surface of the metal side 504 when coupled (e.g., located a distance away but still magnetically coupled through the magnetic field produced by the magnetic material 440).

Further, the exemplary retention apparatus 430 using magnetic material 440 is designed to be used with a tool holding apparatus 500 that is metal, but may also be used with a tool holding apparatus 500 containing any ferromagnetic material. Ferromagnetic material may be defined as material that is attracted by the magnetic field produced by magnetic material. In one or more embodiments, ferromagnetic material may include one or more metals, e.g., iron, that may be magnetized or non-magnetized.

Further, although the exemplary retention apparatus 430 includes magnetic material 440, it is to be contemplated that retention apparatus 430 of the wire-grid apparatus 400 may include any one or more structures, parts, etc. to allow it to be coupled to a tool holding apparatus 500 (metal or non-metal). For example, in at least one embodiment, the retention apparatus 430 may use fasteners such as bolts, screws, etc.

The strength of the magnetic field produced by the magnetic material 440 of the retention apparatus 430 may prescribe the amount of force necessary to move the wire-grid apparatus 400 in an upward direction to be de-coupled from the tool holding apparatus 500. In at least one embodiment, the magnetic material 400 may be a ceramic cup magnet having about 80 pounds of holding power.

The one or more flanges 450 may extend along at least a portion of the edge (e.g., edges 416, 426) (e.g., the entire edge, only a portion of edge proximate the elongate member 432, etc.) and may be configured to be located proximate the flange 508 of the tool holding apparatus 500 to, e.g., assist in the coupling of the wire-grid apparatus 400 to the tool holding apparatus 500. As depicted, the one or more flanges 450 may be welded to the wire-grid wall 420. In other embodiments, the one or more flanges 450 may be fastened (e.g., using bolts, screws, etc.), adhered, etc. to the wire-grid wall 420. In another embodiment, a groove may be defined (e.g., cut into, etc.) in a portion (e.g., the frame 428) of the wire-grid wall 420 to provide one or more flanges. The one or more flanges may restrict movement of the wire-grid walls laterally or horizontally (e.g., parallel to the surface 506 and the ground surface). In the embodiment shown in FIG. 27, the one or more flanges 450 include a first flange 451 and a second flange 452 configured to lie on opposite sides of the flange 508 of the tool holding apparatus 500.

Although the exemplary wire-grid apparatus 400 depicted in FIGS. 24-28 utilizes a pair of flanges 451, 452 and magnetic material 440 to couple the wire-grid apparatus 400 to a tool holding apparatus 500, exemplary wire-grid apparatus may be coupled to a tool holding apparatus 500 using any known connection technique and/or structure including any number of flanges, channels, grooves, fasteners, adhesives, etc.

In at least one embodiment, the retention apparatus 430 may include a single flange locatable in front of the flange 508 of the tool holding apparatus 500 and an elongate member 432 configured to be fastened (e.g., bolted, screwed, etc.) to the metal side of the tool holding apparatus 500. Further, in at least another embodiment, the retention apparatus 430 may include a groove extending along the entire edge (e.g., edge 426) of the wire-grid wall within which the flange 508 of the tool holding apparatus 500 may be located when coupled to the wire-grid apparatus 500. Further, although the flanges 451, 452 as shown in the exemplary embodiment only extend along a portion of the edge of the wire-grid wall, the flanges 451, 452 may extend along a longer portion than shown and/or along the entire length of the edge of the wire-grid wall. In at least one embodiment, the retention apparatus 430 may further include a portion that contacts the surface 506 of the tool holding apparatus, e.g., to provide further support.

Also, the number, size, and/or shape of the magnetic material 440 may be different depending on the configuration of the retention apparatus 430. For example, although the wire-grid wall 420 as depicted includes two retention apparatus 430, each including magnetic material, the wire-grid wall 420 may include a single or more than two retention apparatuses, each including magnetic material (e.g., larger and/or more powerful magnetic material in the single configuration, smaller and/or less powerful magnetic material in the multiple configuration, etc.). In at least one embodiment, the wire-grid apparatus 400 may include magnetic material that is powerful enough to couple to the wire-grid apparatus 400 to a tool holding apparatus 500 but also able to be de-couple by a human user.

Figure 29:
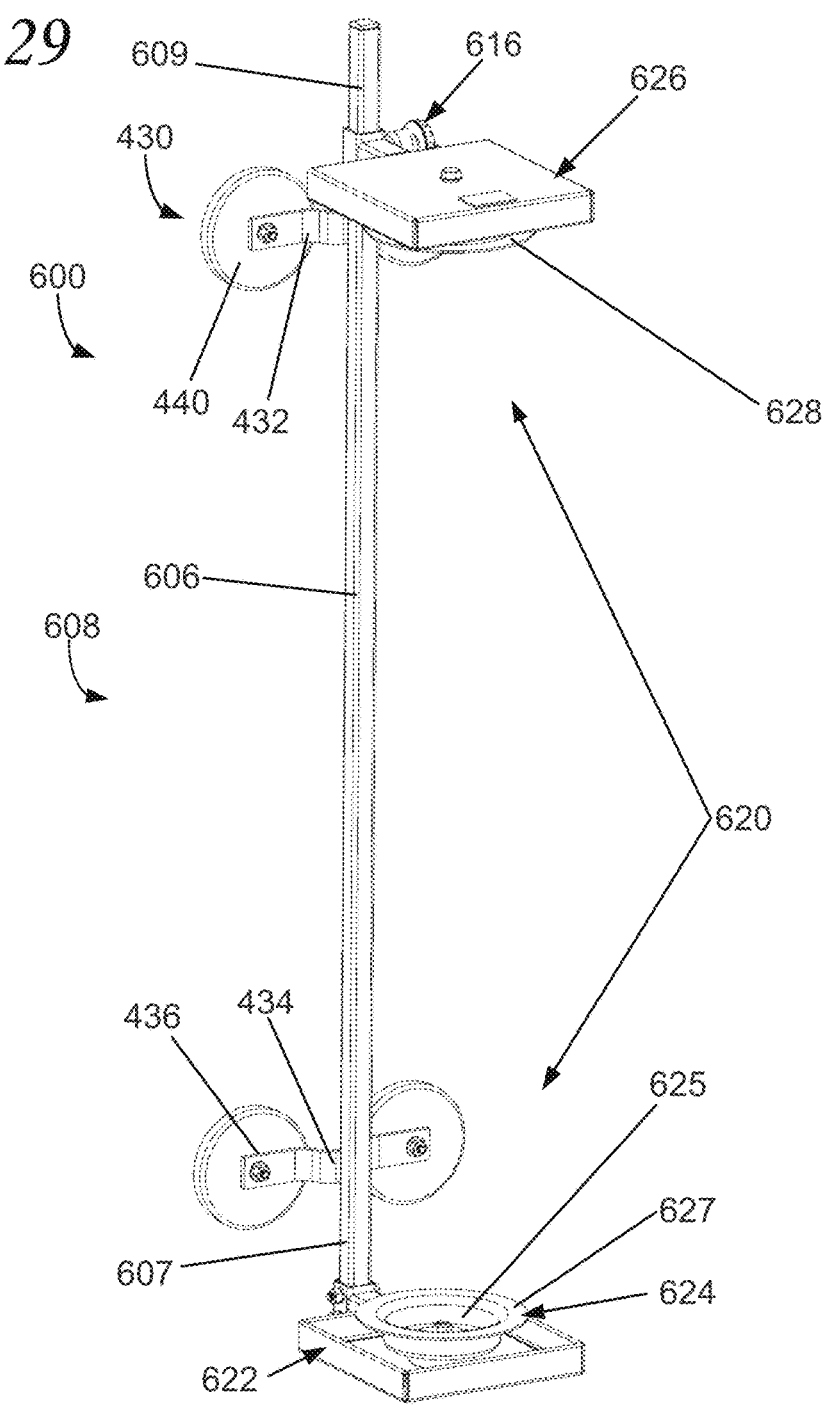
FIG. 29 is a perspective view of an exemplary material holder.
Figure 30:
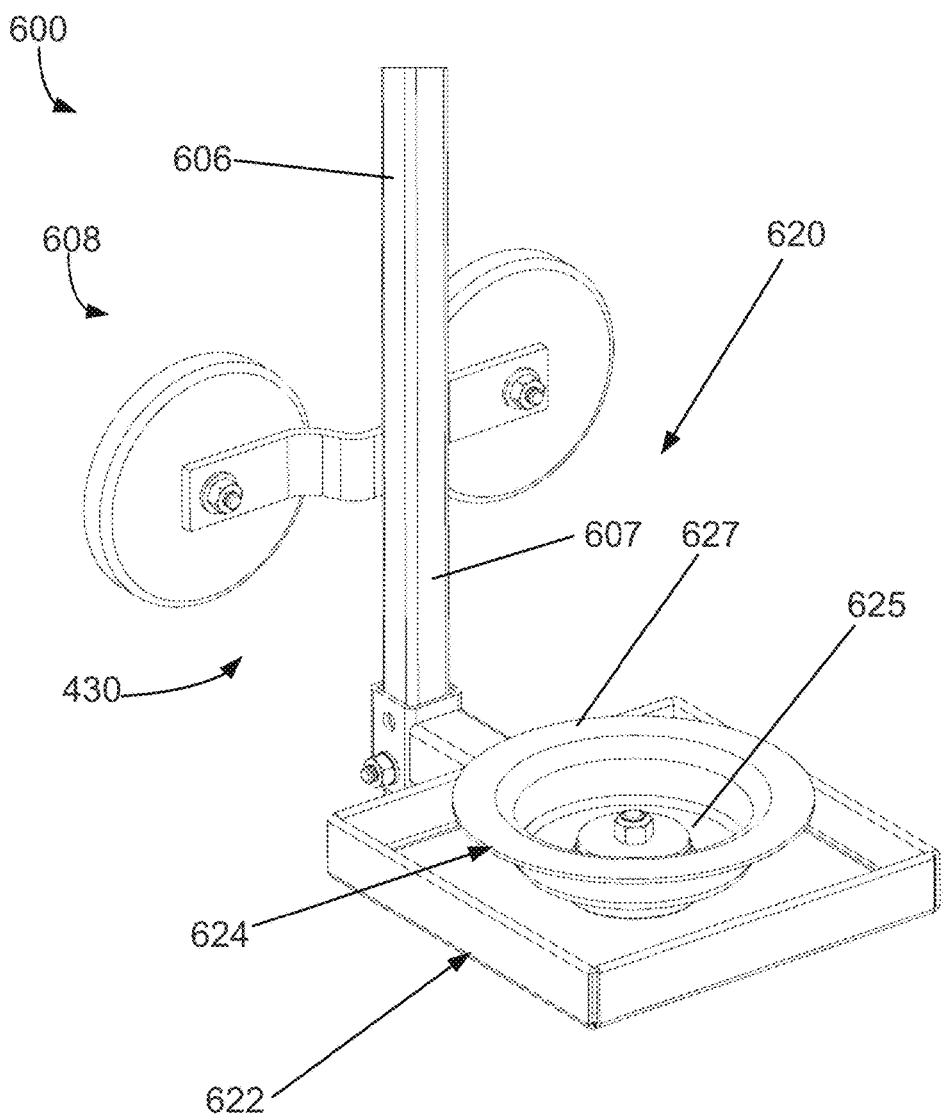
FIG. 30 is a partially-exploded, perspective view of a lower area of the material holder of FIG. 29.
Figure 31:
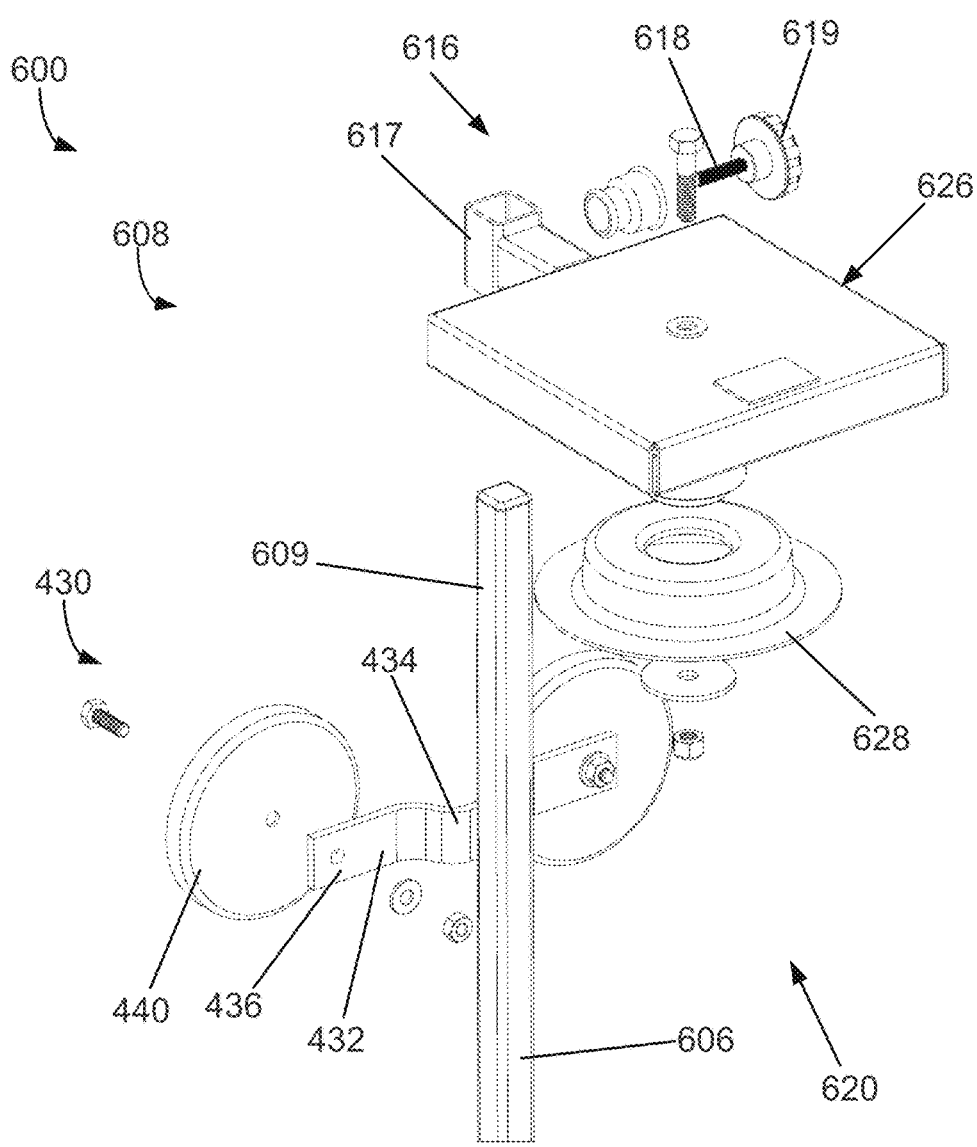
FIG. 31 is a partially-exploded, perspective view of an upper area of the material holder of FIG. 29.

Another exemplary material holder 600 is depicted in FIGS. 29-31. The material holder 600 may be configured to hold one or more rolls of material (e.g., masking material, etc.). For example, a box of material (e.g., a box containing a roll of plastic masking material, etc., such as, a box of material 304) may be held, or retained, by the material holder 600.

The exemplary material holder 600 may include a frame 606 and material holding apparatus 608 coupled to the frame 606 (e.g., welded, bolted, glued, etc.). The frame 606 may include one or more members a single elongate member, a plurality of members, etc.) configured to support the material holding apparatus 608 from a structure (e.g., a free-standing structure or a structure supporting itself from a ground surface, a structure mounted to a wall, etc.). In at least one embodiment, the frame 606 may include a single upright elongate member extending from a tower end portion 607 to an upper end portion 609 along an axis parallel to an axis defined by a roll of material to be held by the material holding apparatus 608, Further, the frame 606 may be coupled to structures such as, e.g., a metal tool box, a stand, a wall, etc. As shown, the frame 606 is coupled to retention apparatus 430 (which may also be referred to as "frame retention apparatus") to be used to removably, or selectively, attach, or couple, the frame 606 (and, in turn, the material holder 600) to a structure. However, the frame 606 may be removably or fixedly coupled to a structure by any method (e.g., welding) as would be known by one having skill in the art. The retention apparatus 430 may be similar to the retention apparatus 430 described herein with reference to FIGS. 24-28. For example, the retention apparatus 430 (which may also be referred to as "frame retention apparatus") may include a magnetic material portion 440 and an elongate portion 432. The elongate portion 432 may extend from a proximal end region 434 to a distal end region 436. The proximal end region 434 may be attached, or coupled, to the frame 606, and the distal end region 436 may be attached, or coupled, to the magnetic material portion 440. The magnetic material portion 440 may be configured to couple the material holder to a structure such as, e.g., a metal surface of a structure. As shown, the material holder 600 includes four sets of magnetic material portions 440 and elongate portions 432. Other exemplary material holders may include more or less than four sets of magnetic material portions 440 and elongate portions 432 depending on the size, shape, and configuration of the material holder 600. In one or more embodiments, the amount and/or strength of the magnetic material portions 400 may be selected based on the size and/or mass of the remainder of the material holder 600 as well as the material to be held by the material holder 600 (e.g., such that the frame retention apparatus 430 may be capable of coupling the material holder 600 to a structure and hold the material above a ground surface).

The material holding apparatus 608 may be configured to hold at least one roll of material (e.g., a roll of material by itself, a roll of material located in a box, etc.) vertically, horizontally, or in any other direction. As shown, the material holding apparatus 608 includes a box holder 620 configured to hold a box of material (e.g., a roll of material located in a box). In other embodiments, the material holding apparatus 608 may include a roll holder (e.g., similar to the roll holder 310) configured to hold a roll of material without a box.

As described, the material holding apparatus 608 (e.g., the box holder 620, etc.) is configured to hold a roll or box of material "vertically." In other words, the material holding apparatus 608 is configured to hold a roll of material such that an axis upon which the roll is rotatable (e.g., an axis extending through the middle of the roll along the length of the roll of material) is perpendicular to a ground surface upon which the structure (which the material holder 600 is coupled to) is located. Further, although the material holding apparatus 608 described herein has been configured to hold one or more rolls of material "vertically," it is to be contemplated that the material holding apparatus 608 may be configured to hold one or more rolls of material in additional, non-vertical positions (e.g., horizontal, at 45 degrees, etc.).

As shown in FIG. 30, the box holder 620 may include a lower box support portion 622 and a lower support disc 624. The lower box support portion 622 may be configured to support the bottom end of a box of material (e.g., similar to the box of material 304 as shown in FIG. 22). The lower box support portion 622 may be fixedly coupled to the frame 606. In other words, the lower box support portion 622 may be unmovable, or restricted in movement, with respect to the frame 606. The lower support disc 624 may be rotationally coupled to the lower box support portion 622 and may be configured to support the bottom end of a roll of material located in the box of material. For example, the bottom side of the box of material may be removed such that the lower end of the roll of material within the box of material may be rested on the lower support disc 624 (e.g., for rotational movement) and the bottom portion of the box of material may be held, or supported, (e.g., supported on all four sides, restricted from horizontal movement, etc.) by the lower box support portion 622 when a box of material is held thereby. More specifically, the roll of material within the box of material may be wrapped around a cylindrical tube. The cylindrical tube may rest within the center portion 625 of the lower support disc 624 while the material wrapped around the material may rest on the flange portion 627.

As shown in FIG. 31, the box holder 620 may further include an upper box support portion 626 and an upper support disc 628 rotationally coupled to the upper box support portion 626. The upper box support portion 626 may be movably coupled to ale frame 606. In other words, ale upper box support portion 626 may be movable with respect to the frame 606 to allow installation, removal, and retention of a box of material by the box holder 620 as described further herein. Similar to the lower box support portion 622, the upper box support portion 626 may be configured to hold, or support, a top portion of the box of material when a box of material is held thereby (e.g., where the top side of the box of material is removed such that the upper end of the roll of material within the box of material may contact the upper support disc 628). Further, in at least one embodiment, when a box of material is held by the box holder 620, the upper support disc 628 or another portion may be configured to be extended into the inside of a cylindrical tube around which the material of the roll of material (i.e., within the box of material) is wrapped.

The upper box support portion 626 may be adjustably coupled to the frame 606 for vertical movement (e.g., for installation and removal of a box of material), e.g., similar to the upper spindle portion 314 of the roll holder 310 described herein with reference to FIGS. 21-23. For example, the material holder 600 may further include material retention apparatus 616 configured to selectively retain (e.g., restrict and release, lock and unlock, restrain and un-restrain, etc.) the upper box support portion 626 from vertical movement (e.g., movement upwardly and downwardly, towards or away from a ground surface, etc.) along an axis of the roll or box of material (e.g., perpendicular to the ground surface). The material retention apparatus 616 may be used to install, or place, a roll of material within the material holder 600. For example, a user may release the upper box support portion 626 from the frame 606 using the material retention apparatus 616 and move the upper box support portion 626 upwardly. After the upper box support portion 626 is located in an upward position, a box of material may be placed on the tower box support portion 622 and the upper box support portion 626 may be moved downwardly over the outside of the box of material. The material retention apparatus 616 may then be used to retain the upper box support portion 626 in this lowered position at least partially around the box of material). More specifically, the material retention apparatus 616 may include a sleeve 617 coupled to the upper box support portion 626 and defining an opening configured to slide around a portion of the frame 606. The material retention apparatus 616 may further include a pin 618 configured to extend through a portion of the sleeve 617 to abut, or contact, the frame 606 to hold, or secure, the sleeve 617 and, in turn, the upper box support portion 626 with respect to the frame 606. In at least one embodiment, the pin 618 may be biased in a direction towards the frame 606 such that a user may pull the pin 618 away from the frame 606 to disengage the pin 618 from the frame 606 thereby releasing, unrestricting, or freeing, the upper box support portion 626 from the frame 606. In at least one embodiment, the pin 618 may be threaded and may be extended through (e.g., screwed into) a threaded hole extending through the sleeve 617 such that a user may rotate or wind the pin 618 to extend and retract the pin 618 to and away from the frame 606 to engage and disengage the pin 618 from the frame. Further, as depicted, a knob 619 may be attached, or coupled, to the pin 618 such that a user may grasp the knob 619 to move the pin 618.

In other words, the upper box support portion 626 may be configured in an open, or raised, configuration in which a box of material may be removed or installed within the box holder 620 and may also be configured in a closed, or lowered, configuration in which a box of material may be retained, or held, by the box holder 620.

Although not depicted, the material holder 600 may further include one or more tear members configured such that material held by the material holding apparatus 608 (e.g., masking material, etc.) may he torn from the rolls of material when pulled across the tear member.

The complete disclosure of the patents, patent documents, and publications cited in the Background, the Summary, the Detailed Description of Exemplary Embodiments, and elsewhere herein are incorporated by reference in their entirety as if each were individually incorporated. Exemplary embodiments of the present disclosure are described above. Those skilled in the art will recognize that many embodiments are possible within the scope of the disclosure. Other variations, modifications, and combinations of the various components and methods described herein can certainly be made and still fall within the scope of the disclosure. Thus, the invention is limited only by the following claims and equivalents thereto.

What is claimed:

1. A material holder for use with a structure, the material holder comprising:
    a frame;
    material holding apparatus coupled to the frame and configured to hold a roll of material contained within a box comprising four sides vertically, wherein each of the four sides define a vertical surface of the box that extends vertically when the material holding apparatus holds the roll of material contained within the box, wherein the material holding apparatus comprises:
        a lower box support portion coupled to the frame, wherein the lower box support portion is configured to support a bottom end of the box and to contact the vertical surface of each of all four sides of the bottom end of the box to restrict the bottom end of the box from horizontal movement,
        an upper box support portion coupled to the frame independent from the lower box support portion, wherein the upper box support portion is configured to support a top end of the box and to restrict the top end of the box from horizontal movement, and
        a lower support disc rotationally coupled proximate to the lower box support portion and configured to support the roll of material vertically thereon for rotational movement thereof, wherein the lower support disc comprises:
            a center portion extending along a first plane and configured to hold and support a cylindrical tube upon which the roll of material is wrapped, wherein the cylindrical tub is configured to rest within the center portion, and
            a flange portion around the center portion extending along a second plane and configured to support the material wrapped around the cylindrical tube, wherein the first plane is spaced apart from the second plane;
    material retention apparatus configured to selectively retain the roll of material and box using the material holding apparatus, wherein the material retention apparatus is selectively configurable in at least an open configuration and a closed configuration, wherein the roll of material and box are removable from the material holding apparatus when the material retention apparatus is in the open configuration, and wherein the roll of material and box are retained by the material holding apparatus when the material retention apparatus is in the closed configuration; and
    frame retention apparatus coupled to the frame and configured to couple the frame to the structure above a ground surface.

2. The material holder of claim 1, wherein the frame retention apparatus further comprises:
    at least one magnetic material portion couplable to a metal surface of the structure; and
    at least one elongate portion extending from a proximal end region to a distal end region, wherein the proximal end region is coupled to the frame and the distal end region is coupled to the at least one magnetic material portion.

3. The material holder of claim 2, wherein the at least one magnetic material portion comprises at least four magnetic material portions.

4. The material holder of claim 1, wherein the frame comprises an elongate member extending from a lower end portion to an upper end portion.

5. The material holder of claim 1, wherein the material holding apparatus further comprises a lower spindle portion coupled to the frame and configured to extend into a center opening of the roll of material.

6. The material holder of claim 1, wherein the material holding apparatus comprises an upper spindle portion coupled to the frame and configured to extend into a center opening of the roll of material.

7. The material holder of claim 1, wherein the material holder further comprises at least one tear member configured to allow a user to tear material from the roll of material by pulling the material across the tear member.

8. The material holder of claim 1, wherein the frame retention apparatus is configured to couple the frame to a stand.

9. A material holder for use with a structure supported from a ground surface, the material holder comprising:
    a frame capable of being removably coupled to the structure to support the frame above the ground surface; and
    material holding apparatus coupled to the frame and comprising a box holder configured to support a box containing a roll of material, the box comprising four sides, wherein each of the four sides define a vertical surface of the box that extends vertically when the material holding apparatus holds the box, wherein the box holder comprises:
        a lower frame support portion fixedly coupled to the frame,
        a lower box support portion configured to support a bottom end of the box and to contact the vertical surface of each of all four sides of the bottom end of the box to restrict the bottom end of the box from horizontal movement, wherein the lower box support portion is coupled to the lower frame support portion,
        an upper frame support portion movably coupled to the frame,
        an upper box support portion configured to support a top end of the box and to restrict the top end of the box from horizontal movement, wherein the upper box support portion is coupled to the upper frame support portion, and
        a lower support disc rotationally coupled to the lower box support portion and configured to support the roll of material vertically thereon for rotational movement, wherein the lower support disc comprises:
            a center portion extending along a first plane and configured to hold and support a cylindrical tube upon which the roll of material is wrapped, wherein the cylindrical tub is configured to rest within the center portion, and
            a flange portion around the center portion extending along a second plane and configured to support the material wrapped around the cylindrical tube, wherein the first plane is spaced apart from the second plane.

10. The material holder of claim 9, wherein the material holder further comprises frame retention apparatus coupled to the frame and configured to couple the frame to the structure above the ground surface.

11. The material holder of claim 10, wherein the frame retention apparatus further comprises:

at least one magnetic material portion couplable to a metal surface of the structure; and at least one elongate member extending from a proximal end region to a distal end region, wherein the proximal end region is coupled to the frame and the distal end region is coupled to the at least one magnetic material portion.

12. The material holder of claim 10, wherein the frame retention apparatus is configured to couple the frame to a stand.

13. The material holder of claim 9, wherein the frame comprises an elongate member extending from a lower end portion to an upper end portion.

14. The material holder of claim 9, wherein material holding apparatus further comprises material retention apparatus configured to selectively retain the box containing the roll of material, wherein the material retention apparatus is selectively configurable in at least an open configuration and a closed configuration, wherein the box containing the roll of material is removable from the material holding apparatus when the material retention apparatus is in the open configuration, and wherein the box containing the roll of material is retained by the material holding apparatus when the material retention apparatus is in the closed configuration.

15. The material holder of claim 9, wherein the material holder further comprises at least one tear member configured to allow a user to tear material from the roll of material by pulling the material across the tear member.

16. The material holder of claim 1, wherein the upper box support portion is configured to contact the vertical surface of each of all four sides of the bottom end of the box to restrict the top end of the box from horizontal movement.

17. The material holder of claim 9, wherein the upper box support portion is configured to contact the vertical surface of each of all four sides of the bottom end of the box to restrict the top end of the box from horizontal movement.

18. The material holder of claim 1, wherein the first plane is parallel to the second plane, and wherein the second plane is located between the first plane and the upper box support portion.

19. The material holder of claim 9, wherein the first plane is parallel to the second plane, and wherein the second plane is located between the first plane and the upper box support portion.

* * * * *